Figure 16:
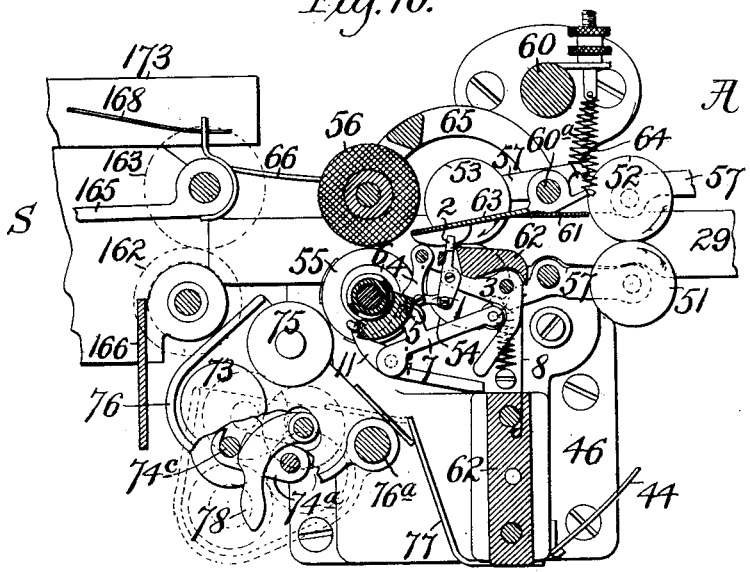

No. 657,939. Patented Sept. 18, 1900.
F. G. JAHN.
MAIL MATTER MARKING MACHINE.
(Application filed May 8, 1893. Renewed Jan. 16, 1900.)
(No Model.) 14 Sheets—Sheet 1.
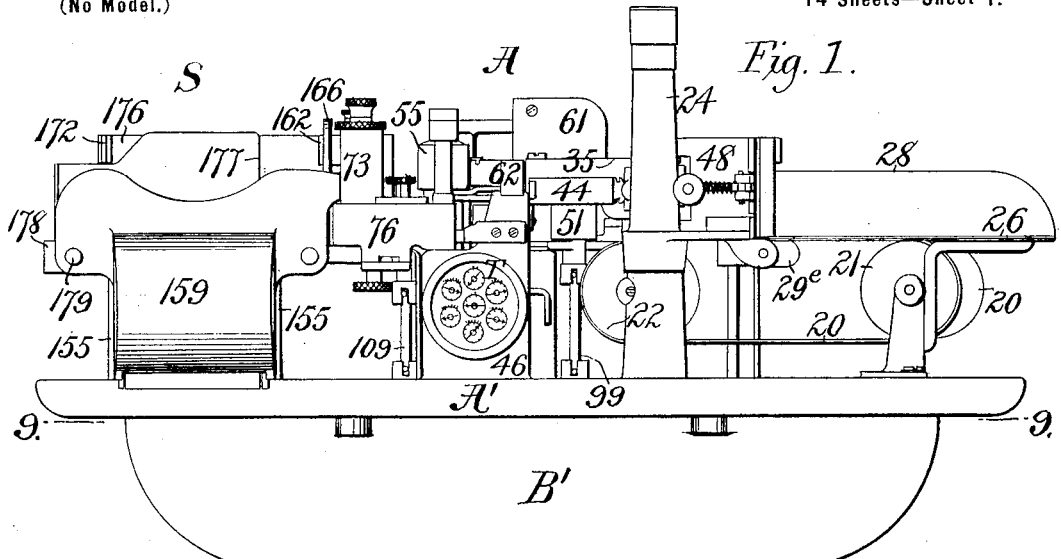
Fig. 1.
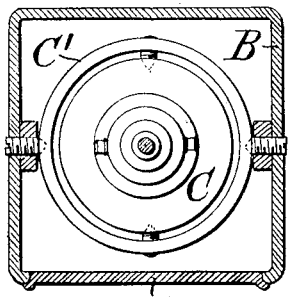
Fig. 1ª
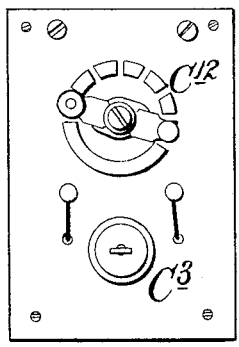
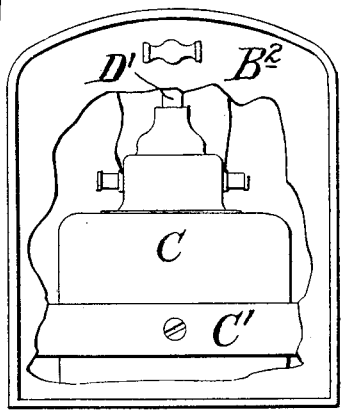
WITNESSES:
W. H. Graham
G. Schermerhorn Seward
INVENTOR
Frederick G. Jahn,
BY
Geo. H. Graham
ATTORNEY

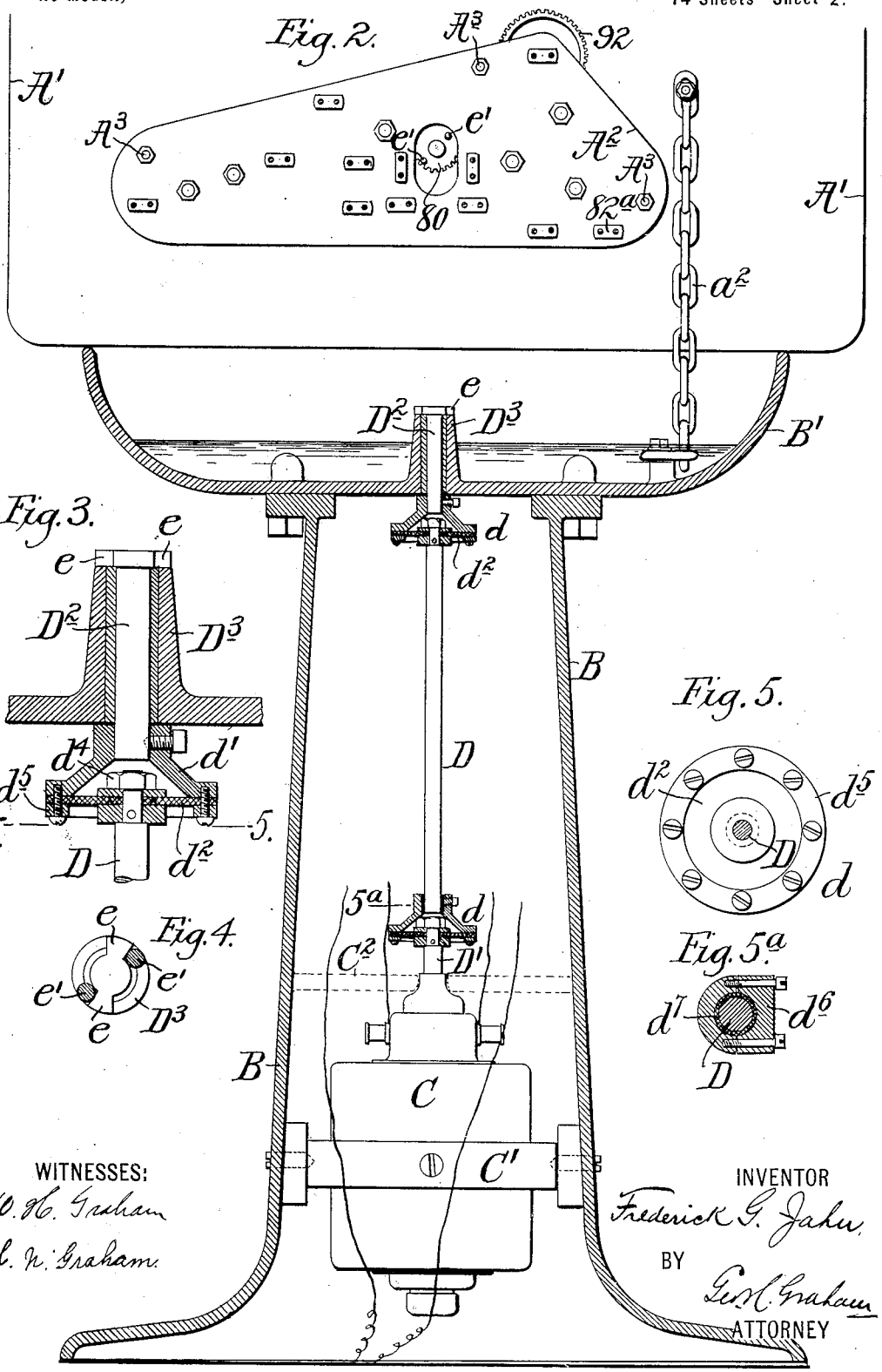

No. 657,939. Patented Sept. 18, 1900.
F. G. JAHN.
MAIL MATTER MARKING MACHINE.
(Application filed May 8, 1893. Renewed Jan. 16, 1900.)
(No Model.) 14 Sheets—Sheet 3.
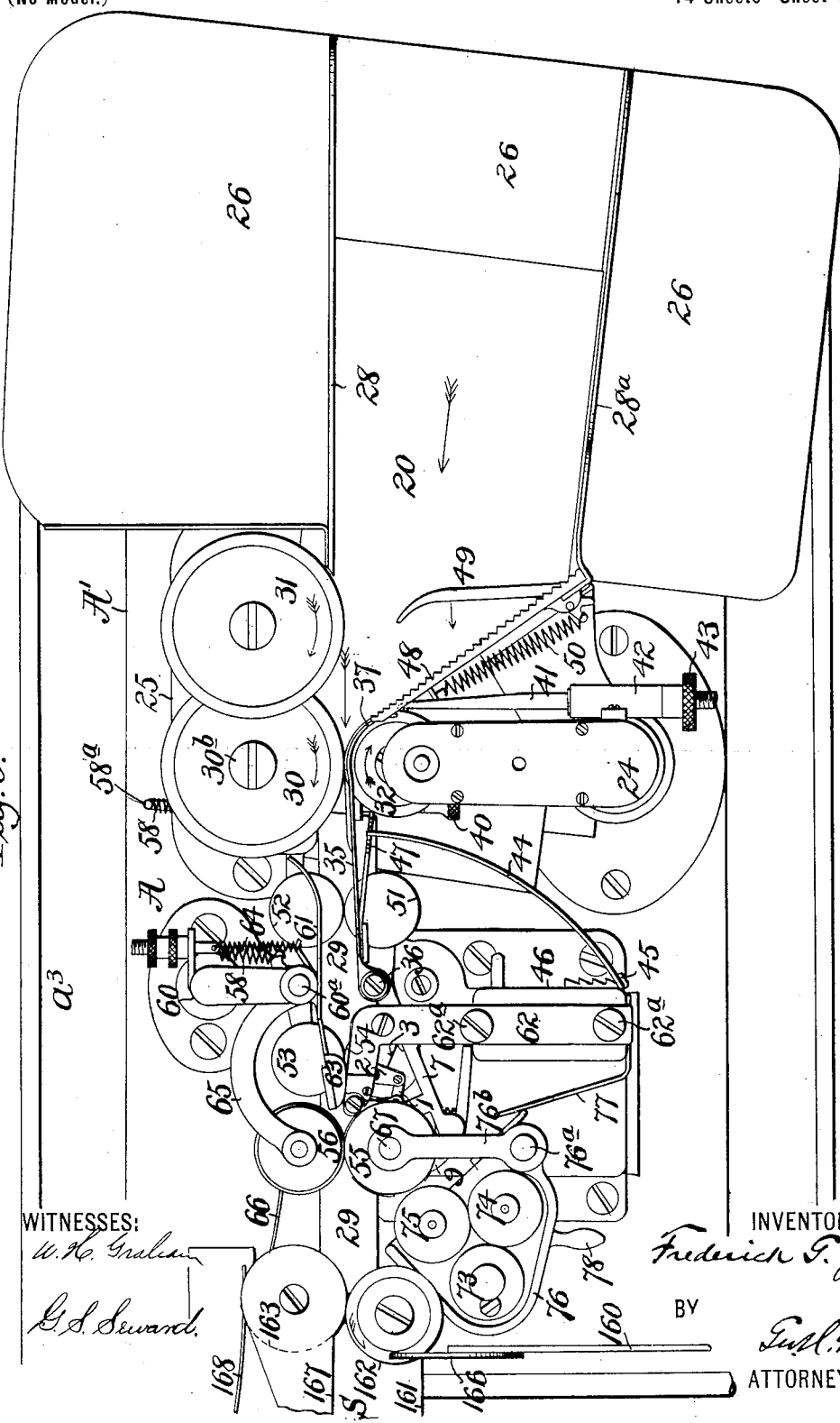

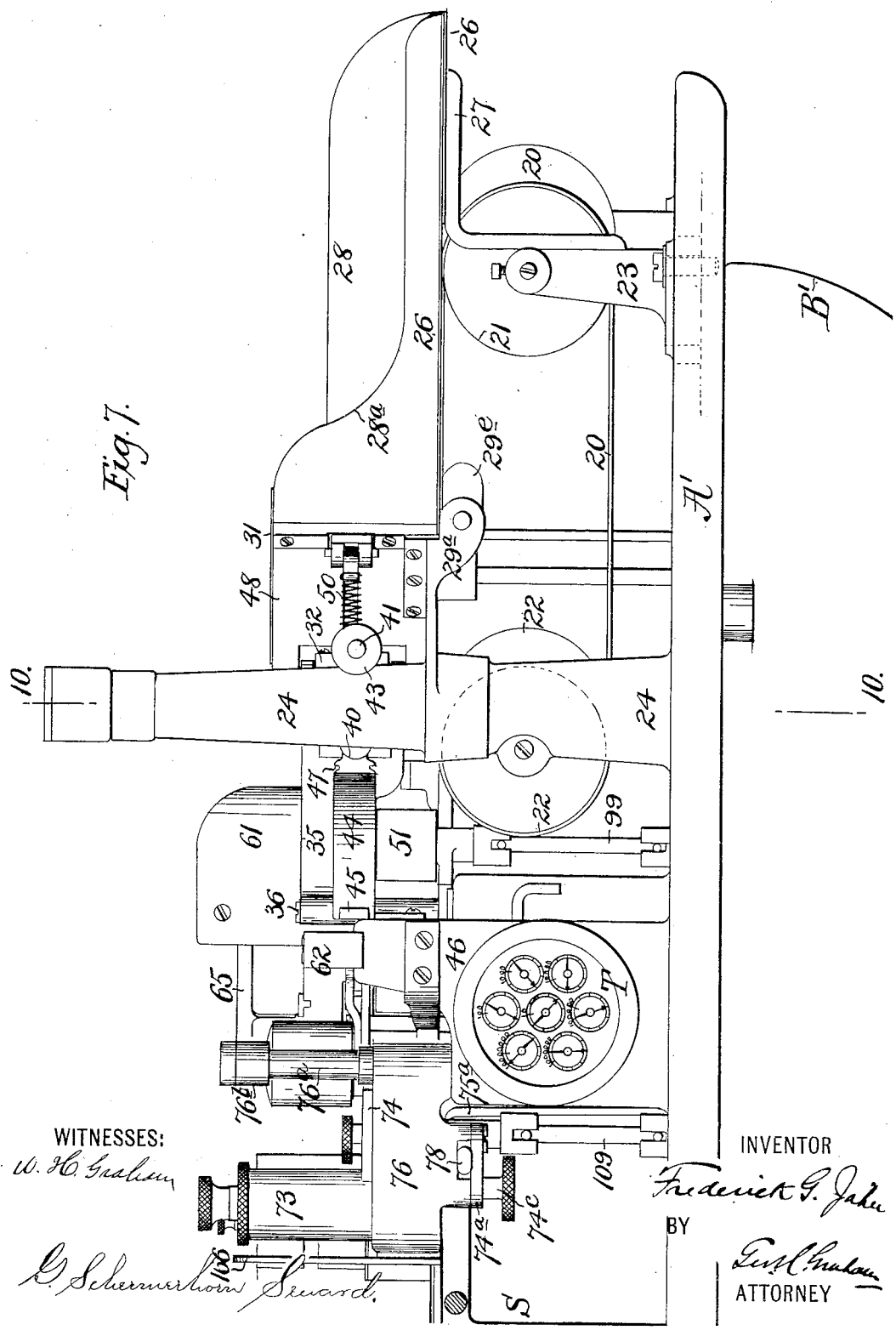

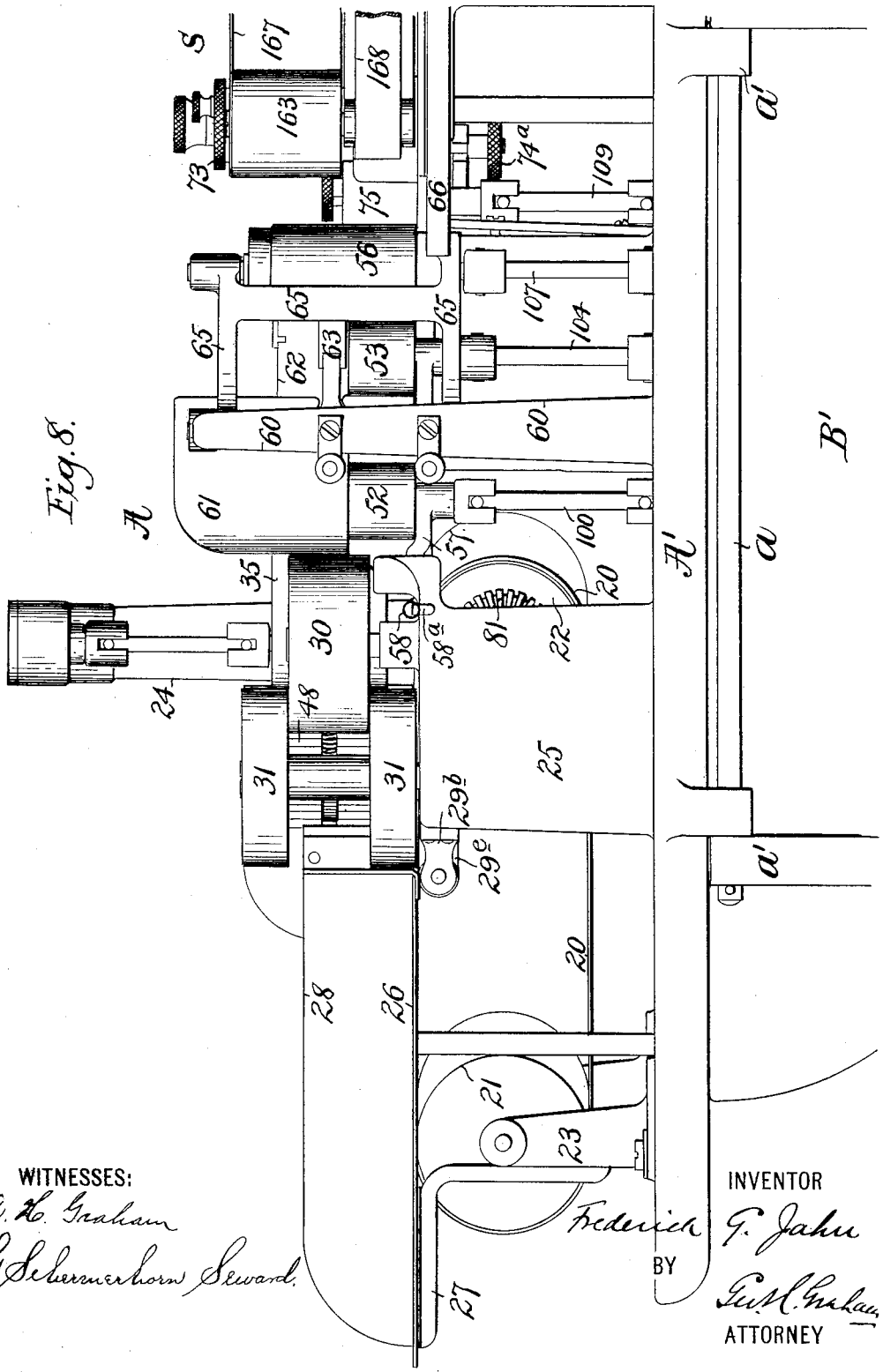

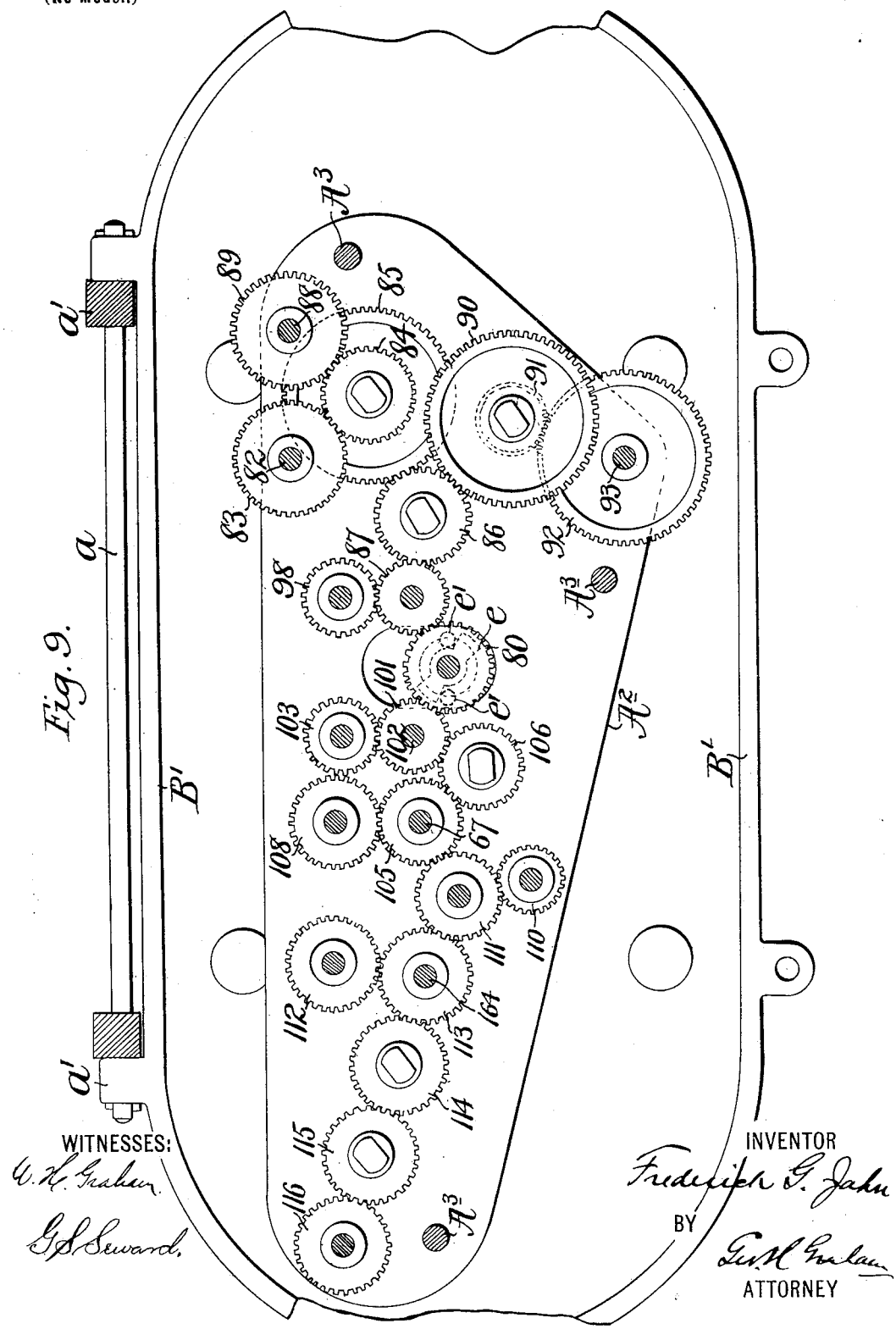

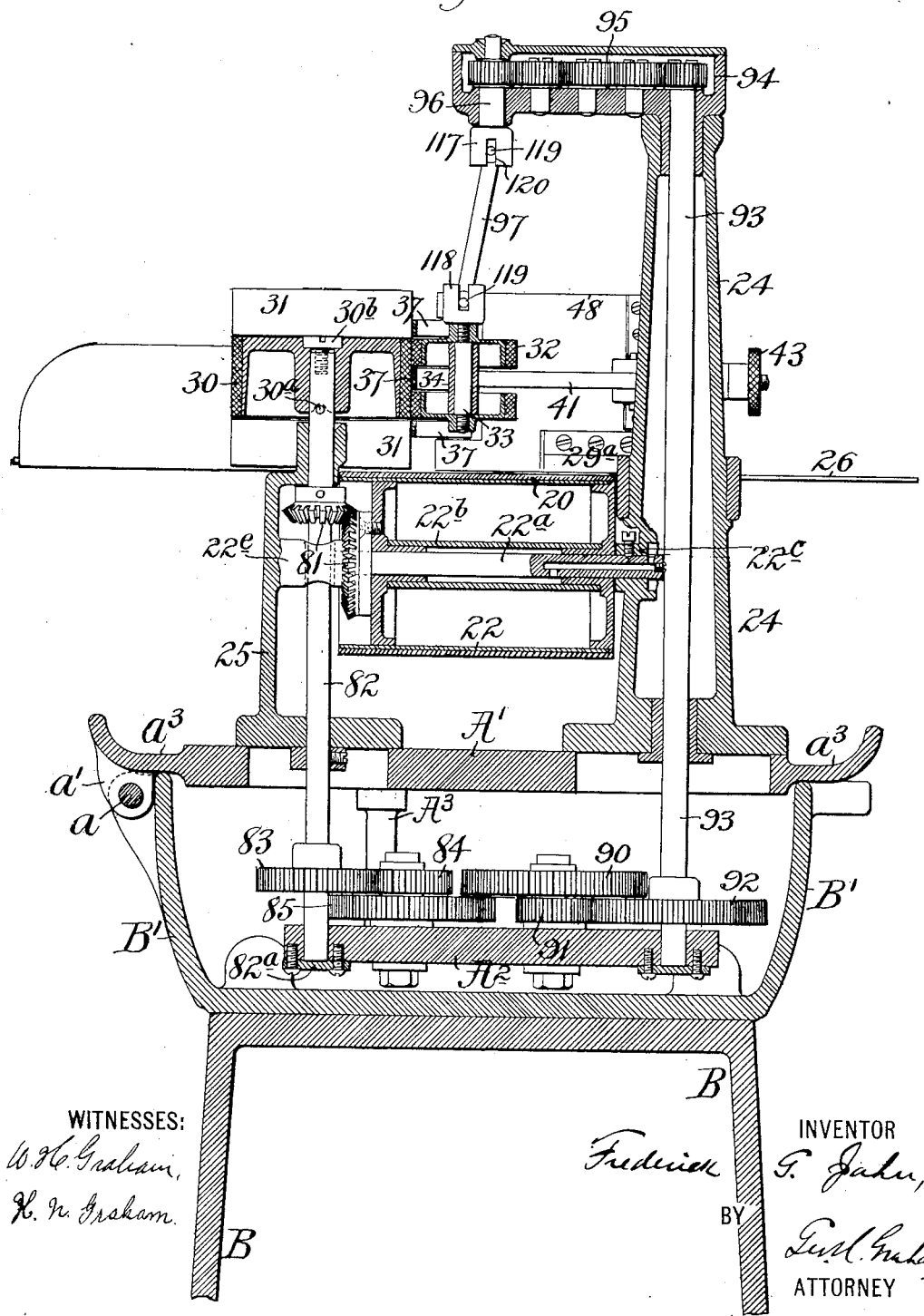

No. 657,939. Patented Sept. 18, 1900.
F. G. JAHN.
MAIL MATTER MARKING MACHINE.
(Application filed May 8, 1893. Renewed Jan. 16, 1900.)
(No Model.) 14 Sheets—Sheet 8.
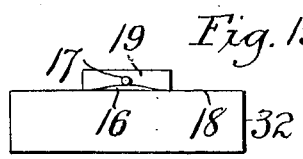
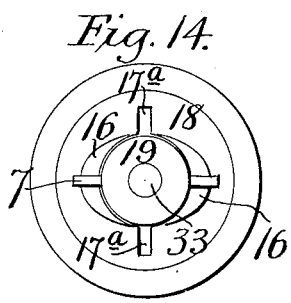
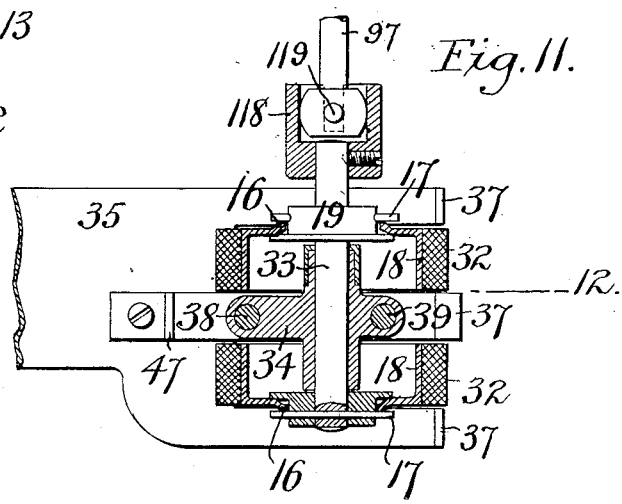
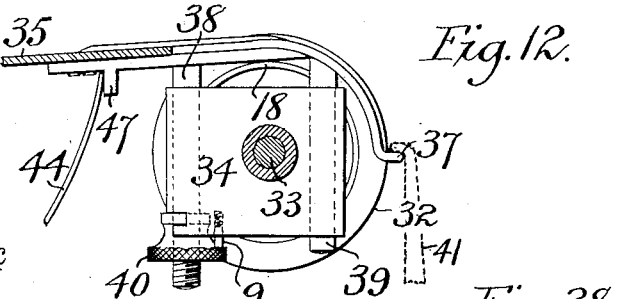
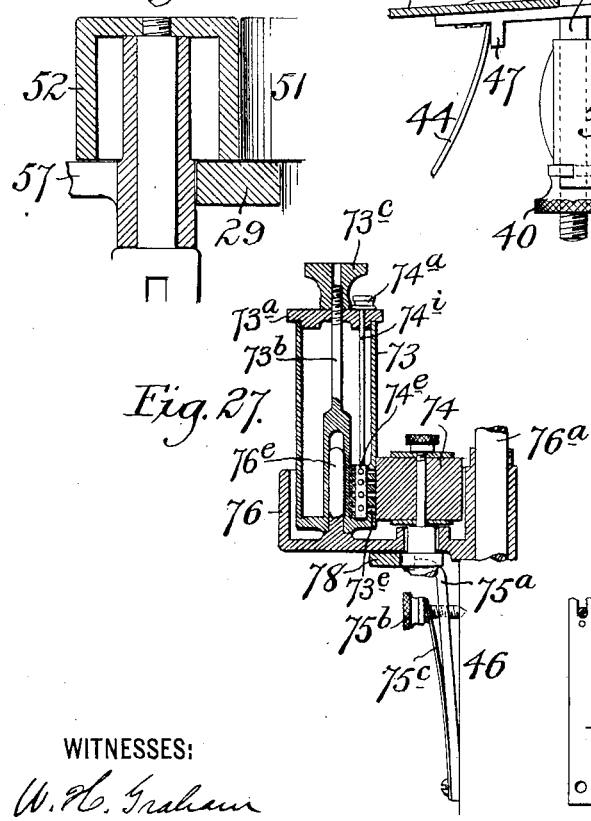
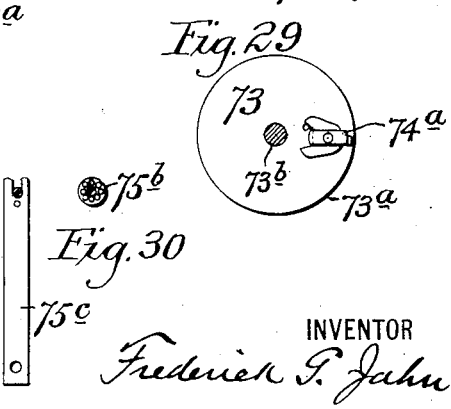
WITNESSES:
W. H. Graham
E. L. Todd
INVENTOR
Frederick G. Jahn
BY
Geo. C. Graham
ATTORNEY
THE NORRIS PETERS CO., PHOTO-LITHO., WASHINGTON, D. C.

No. 657,939. Patented Sept. 18, 1900.
F. G. JAHN.
MAIL MATTER MARKING MACHINE.
(Application filed May 8, 1893. Renewed Jan. 16, 1900.)

(No Model.) 14 Sheets—Sheet 9.

WITNESSES: INVENTOR
W. H. Graham Frederick G. Jahn,
H. N. Graham. BY
                                    ATTORNEY No. 657,939. Patented Sept. 18, 1900.
F. G. JAHN.
MAIL MATTER MARKING MACHINE.
(Application filed May 8, 1893. Renewed Jan. 16, 1900.)
(No Model.) 14 Sheets—Sheet 10.
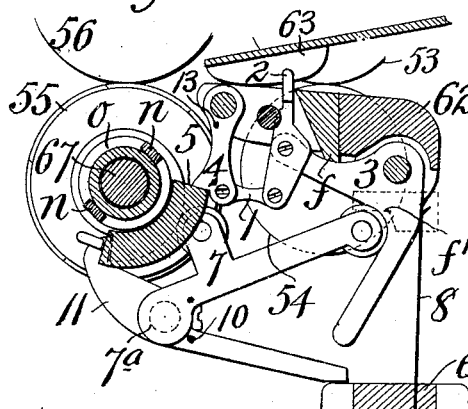
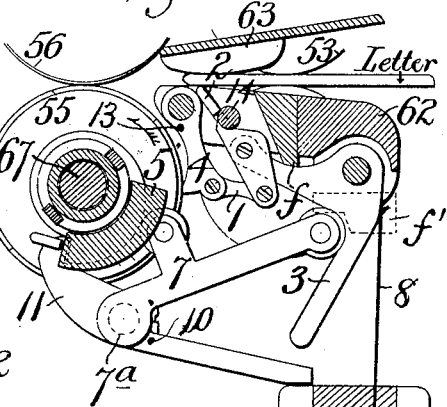
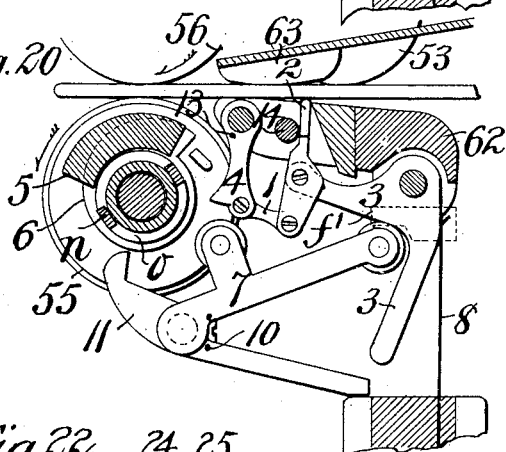
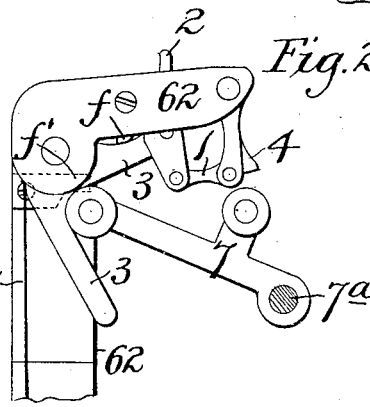
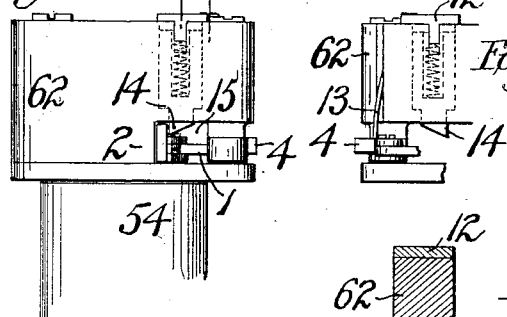
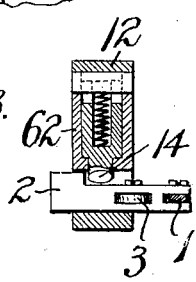
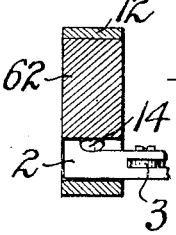
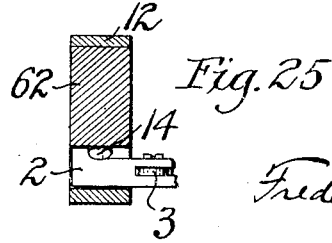
WITNESSES:
W. H. Graham
E. L. Todd
INVENTOR
Frederick G. Jahn
BY
Geo. H. Graham
ATTORNEY
THE NORRIS PETERS CO., PHOTO-LITHO., WASHINGTON, D. C.

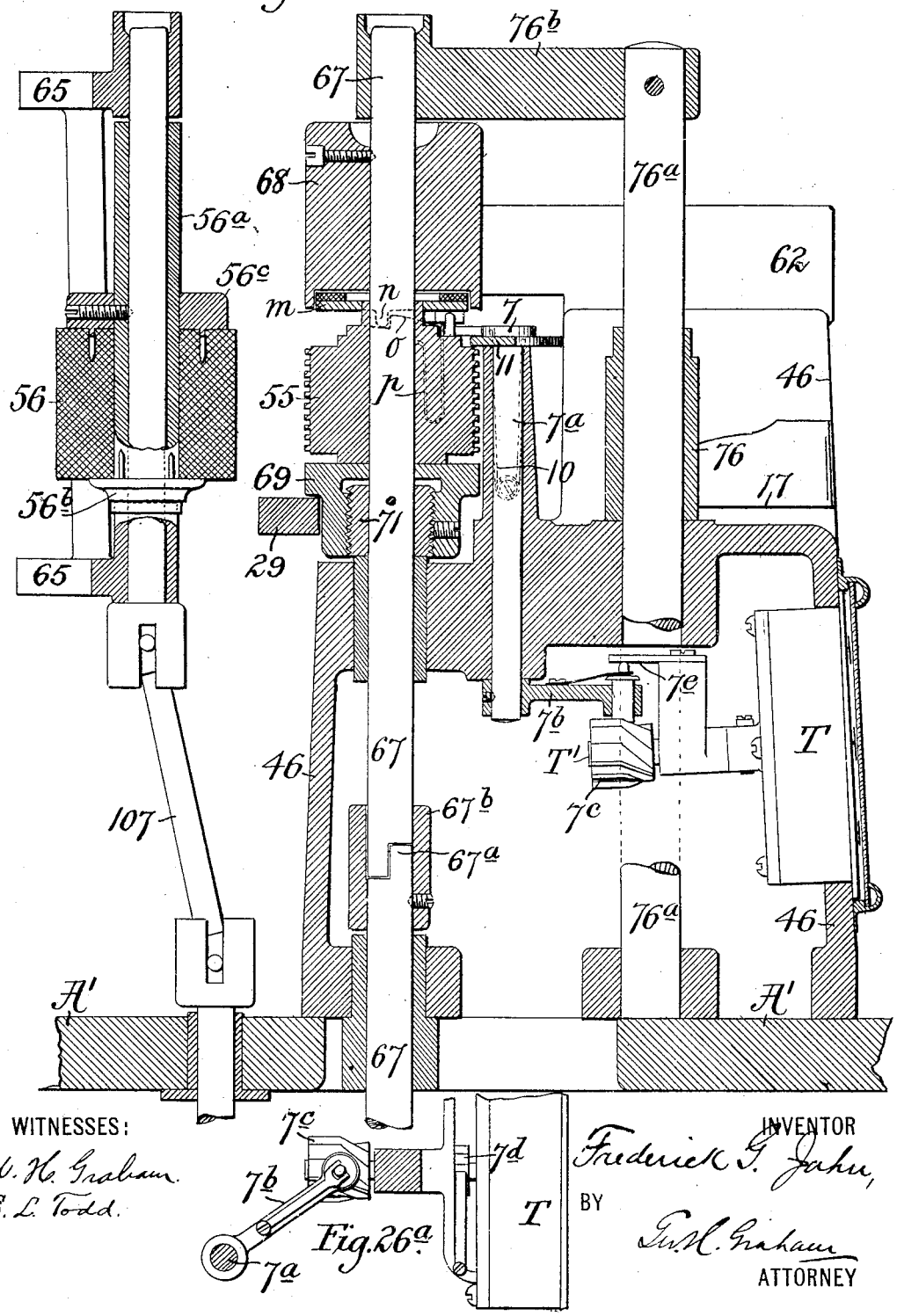

No. 657,939. Patented Sept. 18, 1900.
F. G. JAHN.
MAIL MATTER MARKING MACHINE.
(Application filed May 8, 1893. Renewed Jan. 16, 1900.)
(No Model.) 14 Sheets—Sheet 12.
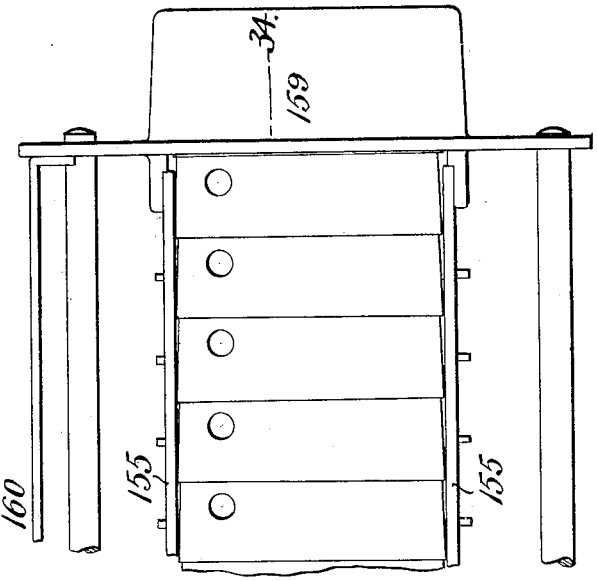
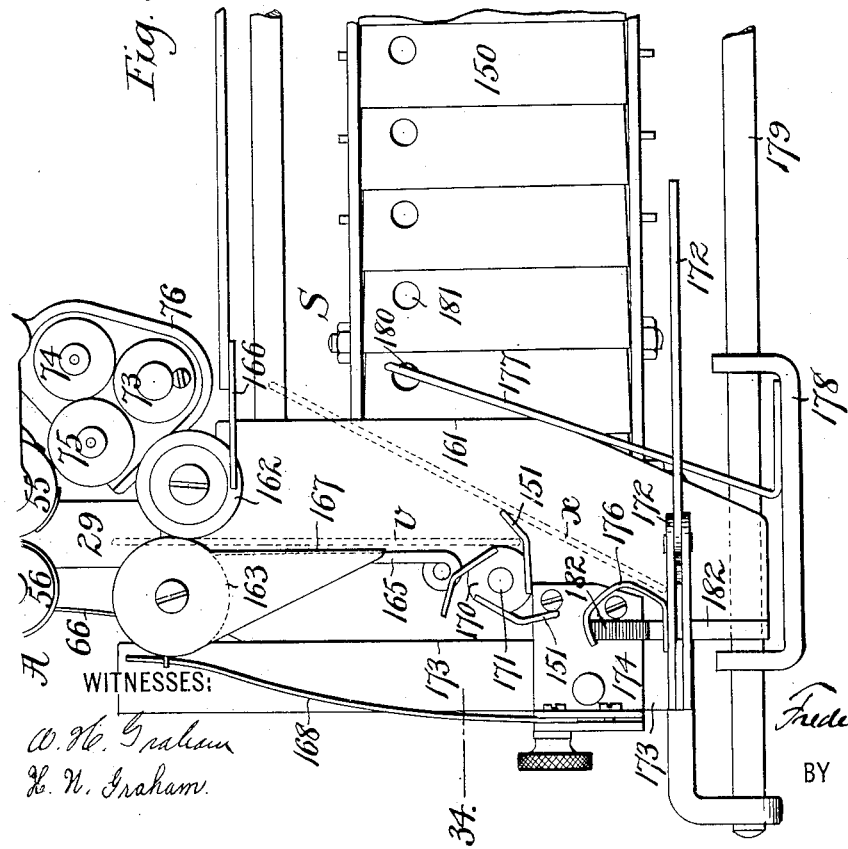
Fig. 31.
WITNESSES:
W. H. Graham
H. N. Graham
INVENTOR
Frederick G. Jahn,
BY
Geo. H. Graham
ATTORNEY
THE NORRIS PETERS CO., PHOTO-LITHO., WASHINGTON, D. C.

No. 657,939. Patented Sept. 18, 1900.
F. G. JAHN.
MAIL MATTER MARKING MACHINE.
(Application filed May 8, 1893. Renewed Jan. 16, 1900.)
(No Model.) 14 Sheets—Sheet 13.

WITNESSES:
W. H. Graham
H. N. Graham

INVENTOR
Frederick G. Jahn,
BY
W. H. Graham
ATTORNEY

No. 657,939. Patented Sept. 18, 1900.
F. G. JAHN.
MAIL MATTER MARKING MACHINE.
(Application filed May 8, 1893. Renewed Jan. 16, 1900.)
(No Model.) 14 Sheets—Sheet 14.
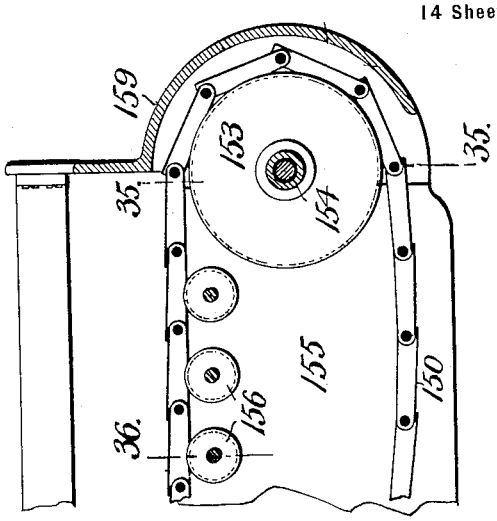
Fig. 36.
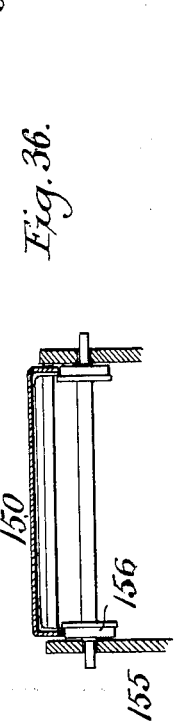
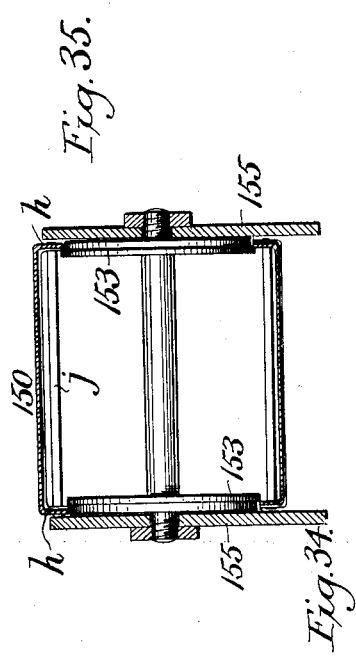
Fig. 35.
Fig. 34.
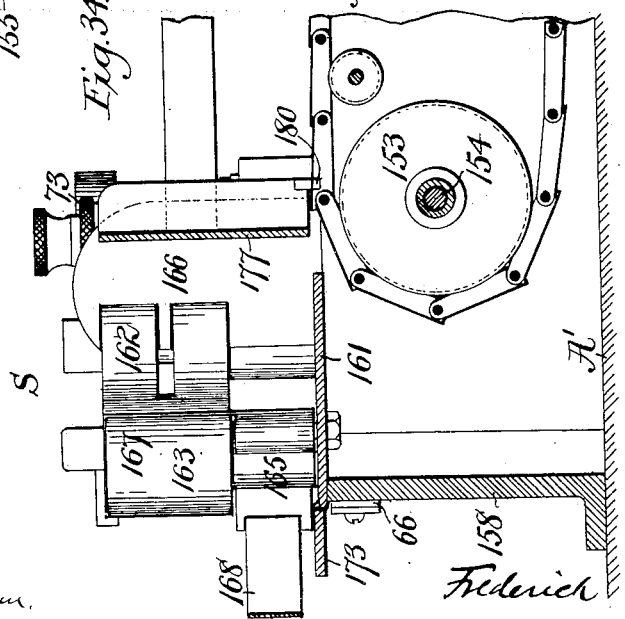
WITNESSES:
U. H. Graham.
H. N. Graham.
INVENTOR
Frederick G. Jahn
BY
Geo. H. Graham
ATTORNEY

UNITED STATES PATENT OFFICE.

FREDERICK G. JAHN, OF NEW YORK, N. Y., ASSIGNOR, BY MESNE ASSIGNMENTS, TO THE INTERNATIONAL POSTAL SUPPLY COMPANY OF NEW YORK, OF NEW YORK.

MAIL-MATTER-MARKING MACHINE.

SPECIFICATION forming part of Letters Patent No. 657,939, dated September 18, 1900.

Application filed May 8, 1893. Renewed January 16, 1900. Serial No. 1,685. (No model.)

*To all whom it may concern:*

Be it known that I, FREDERICK G. JAHN, a citizen of the United States of America, residing at the city of New York, (Brooklyn,) county of Kings, State of New York, have invented certain new and useful Improvements in Mail-Matter-Marking Machines, of which the following is a specification.

This invention relates generally to printing and marking machinery, and particularly to that class of such machinery now known as "mail-marking" or "postage-stamp-canceling" machines.

The objects of the present improvements are to generally improve the construction and operation of such machines, to adapt them to greater speed without sacrificing their efficiency, to increase the range of adjustments of their operative parts, to better adapt them for use where the rapid accumulation of dust interferes with their operation, and to make the machines entirely self-contained and capable of operation in any desired place without requiring special arrangement or change in the power of driving the same.

To this end the invention consists in the hollow stand supporting the machine and also inclosing the motor for driving the machine, in the oil-trough or gearing-housing in which the connections for positively driving the operative parts of the machine are inclosed and protected from the dirt accumulating from handling mail-matter and also in which a supply of oil is kept for continuously oiling the connected gearing, in the manner of supporting all the operative parts of the machine from below and arranging said operative parts a distance above the bed-plate, so that the accumulation of dirt will not interfere with such operative parts, and in the positive driving connections for the operative parts of the machine, in contradistinction to the use of belts, whereby all the operative parts move in unison and positively carry the letters or other matter through it, with means by which the driver, also positively driven, is connected frictionally with the gearing of the machine proper, so that should any stoppage occur such stoppage will be permitted without affecting the motor or injuring the matter causing the stoppage.

The invention furthermore consists in the improved separator-roll and plate and the means for adjusting them simultaneously and independently of one another, in the feed-rolls arranged to engage with the lower portion only of the passing mail-matter, in contradistinction to feed-rolls of sufficient length to engage the entire surface of the mail-matter, in the manner of supporting the letter strip or feeler and in its construction and coaction with the clutch of the printing-roll, in the construction of the printing and platen rolls, in the inking device and its various adjustments, and in the details of construction of the various parts of the machine and the stacker.

As a better understanding of the improvements will be had from a detailed description thereof, such description will now be given, reference being had to the accompanying drawings, illustrating a practical embodiment of the invention.

Figure 17:
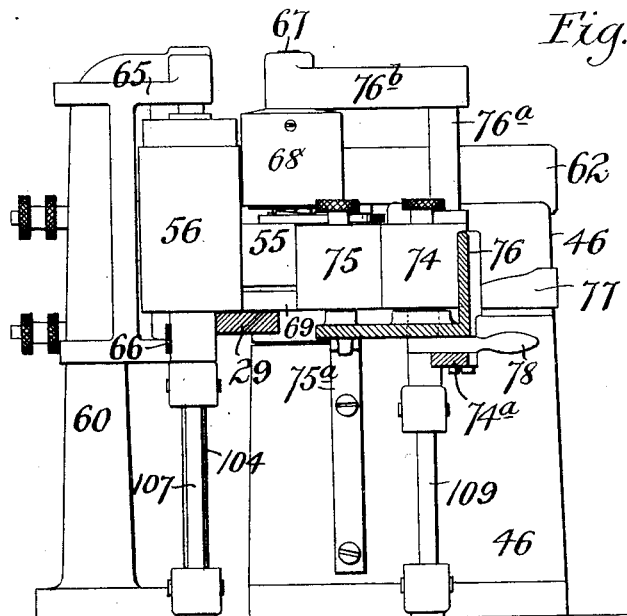
Figure 32:
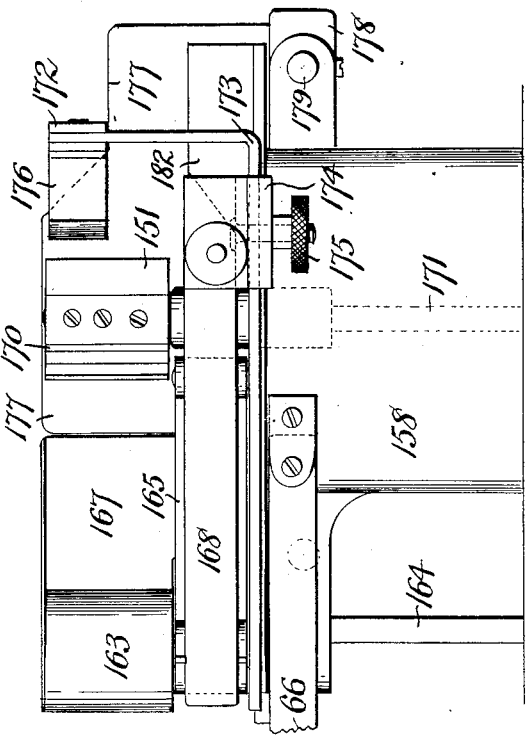
Figure 33:
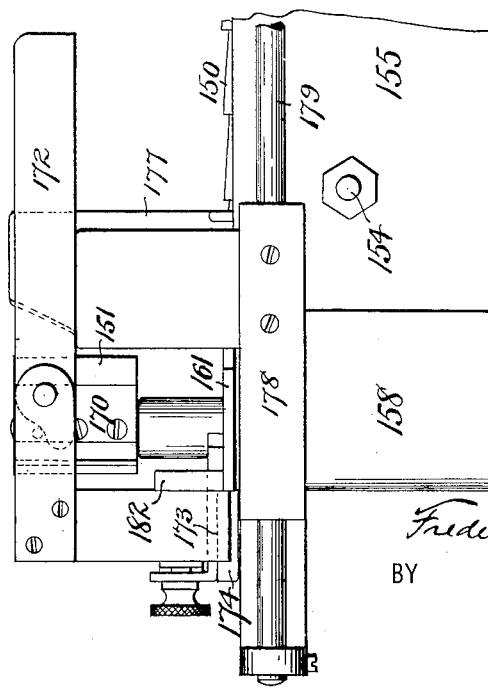

In said drawings, Figure 1 is a side elevation of the complete machine, a portion of the lower part of the machine-stand being broken away to disclose the driving-motor; and Fig. 1$^a$ is a horizontal section on the line 1$^a$ of Fig. 1. Fig. 2 is a vertical sectional elevation of the machine-stand, disclosing the driving-motor and its connections with the driving-shaft of the machine, showing also the base-plate of the machine turned upward, with the mechanism it supports disconnected from the driving-shaft. Fig. 3 is an enlarged detail section of the upper part of the driving-shaft and its bearing. Fig. 4 is a plan view of the extreme upper end of the driving-shaft with the removable engaging studs of the upper mechanism shown in position in section. Fig. 5 is a bottom view and section, on the line 5 of Fig. 3, of the universal joint between the portions of the driving-shaft, and Fig. 5$^a$ is a section on the line 5$^a$ of Fig. 2. Fig. 6 is a plan view of the upper portion of the machine, the main portion of the stacker being omitted on account of lack of space, the parts being enlarged over Figs. 1 and 2. Fig. 7 is a side elevation of the upper portion of the machine looking in the same direction as in Fig. 1, the main portion of the stacker being omitted for a like reason as in Fig. 6. Fig. 8 is a side elevation looking from the opposite side of the machine to that of Fig. 7. Fig. 9 is a horizontal section taken on the line 9 9 of Fig. 1 just below the base-plate, showing the top of the machine-stand in plan and the gearing for the mechanism that is supported above the base-plate. Fig. 10 is a vertical cross-section taken on the line 10 10 of Fig. 7, showing the initial feed-rolls, the separator-rolls, and the inner feed-belt roll and their driving connections. Fig. 11 is a vertical sectional elevation of the separator-roll and its support and the separator-plate. Fig. 12 is a horizontal section on the line 12 of Fig. 11 of the separator roll and plate. Fig. 13 is an elevation of one of the separator-roll skeleton frames, with its hub. Fig. 14 is a plan view of the same. Fig. 15 is a vertical section of one of the feed-rollers, with a stationary plate 29. Fig. 16 is a horizontal section of the printing and platen rollers and adjacent devices, showing also a portion of the stacker. Fig. 17 is an end elevation, partly in section, showing particularly the printing and platen rolls and the inking-rolls. Figs. 18, 19, and 20 are enlarged horizontal sections in different positions of the trip or finger and its operating connections with the clutch of the printing-rolls. Fig. 21 is a bottom view of the sustaining-bar and trip or finger, with its adjacent connections supported by said bar. Fig. 22 is an inner face view of the sustaining-bar and the trip or finger, with the underlying feed-roll. Fig. 23 is an outside elevation of a portion of the sustaining-bar, showing particularly the stop-pawl of the clutch and the spring-pressed latch for the trip or finger. Figs. 24 and 25 are sectional details on the lines 24 25 of Fig. 22 of the sustaining-bar and spring-pressed latch, with the trip or finger in different positions. Fig. 26 is an enlarged vertical cross-sectional elevation of the printing and platen rollers and the counter, showing a slightly-modified form of the platen-roll, the latter being shown in its outward positions, to which it is adapted to yield during the passage of a very thick letter; and Fig. 26$^a$ is a plan of a portion of the counter-actuating device. Fig. 27 is a sectional elevation of the inking device, its holder, and the adjustable stop. Fig. 28 is a sectional plan view of the ink-fountain. Fig. 29 is a cross-section of a portion of the ink-fountain, taken on the line 29 of Fig. 27, showing particularly the means for adjusting the feed of the ink. Fig. 30 shows by side and front elevation details of the locking-spring and rear of the adjusting-nut for the stop of the inking-device holder. Fig. 31 is a plan view of the stacker, with the adjacent portions of the inking device and the printing and platen rolls, the stacker being foreshortened for lack of room. Fig. 32 is a rear side elevation of the stacker looking from the left of Fig. 31. Fig. 33 is an elevation of a portion of the stacker looking from the right of Fig. 32. Fig. 34 is a longitudinal section on the line 34 of Fig. 31. Fig. 35 is a vertical section on the line 35 of Fig. 34. Fig. 36 is a vertical section on the line 36 of Fig. 34.

The improved mail-matter-marking machine A is supported by and some of its parts contained within a stand B, arranged to rest upon the floor. The stand is hollow from its base upward, and its upper end carries an oil-trough and gearing-housing B', the upper end of which forms the immediate support for the base-plate A' of the marking-machine proper and for the stacker S. The hollow stand B is arranged to support and wholly inclose a driving-motor C, an electric motor being shown and preferred, access thereto through the stand being had by an opening in said stand closed by a door or side plate B$^2$. This hollow stand wholly inclosing the motor is important in this class of machines, owing to the enormous accumulation of dust and foreign substances incident to the handling of mail-matter, which would injure the motor, and thereby interrupt the operation of the machine and delay the marking of the mail-matter. The stand, which forms a rigid support for the machine, occupies a comparatively-small floor-space, which in post-offices is a great desideratum, and the motor being within the stand the entire machine and its driving-motor are self-contained, obviating, as will appear hereinafter, all outside driving-belts leading from some exterior motor that are liable to displacement and stretching and which might obstruct proper command of the machine on all of its sides and enabling the machine to occupy any point found most convenient without making it necessary to accommodate the driving-motor thereto or it to such motor. The motor C is preferably supported and connected to the stand by a gimbal C', as in Fig. 1$^a$, allowing a certain amount of vibration thereof without affecting the stand and also obviating the necessity of lining it up with respect to the driving-shaft.

The front of the stand B is provided with a plate carrying a starting and stopping mechanism for the motor, which in this case is represented by a rheostat C$^{12}$ and a switch C$^3$, suitable electric connections being provided between a proper generator and the motor, such connections without the machine coming through or along the floor.

The motor C, Fig. 2, is connected with a vertical driving-shaft D, extending centrally of the stand, which shaft, with the motor-shaft, is shown in three sections; but this is not essential. The lower and upper sections D' D$^2$ are connected to the intermediate section or shaft D by universal joints $d$, which render it unnecessary to mount the motor with any great particularity and also prevent the vibrations thereof when running at its usual high speed affecting the upper operating parts of the machine proper. The universal joints each consist of a flanged hub $d'$, connected to the lower ends of two of the sections D$^2$ D and a flexible disk $d^2$, preferably of leather, clamped to the upper ends of the sections D D' between a collar $d^3$, having prongs engaging the disk and a washer and nut $d^4$, screwed onto the ends of the sections, as in Fig. 3. The flexible disk is in turn secured around its edge to the flange of the disk by a ring $d^5$, screwed to the flange, as in Fig. 5, which rigidly connects the sections of the shaft together, while the flexibility of the disk allows one shaft-section to move out of alinement with respect to the other, and it also absorbs the vibrations that might otherwise be transmitted to the mechanism of the machine proper. The upper flanged hub $d'$ is firmly secured to the shaft-section $D^2$, so that so far as the sections $D^2$ and D are concerned they turn in unison. The other flanged hub at the lower end of the shaft D is only frictionally connected thereto, as by a divided portion having a clamping-plate $d^6$ in Fig. 5$^a$, with an internal fiber-bushing $d^7$, encircling the shaft at that point. This frictional connection between the motor-shaft section D' and the other section of the shaft—it might be located at some other convenient point—in effect allows the operative mechanism of the machine proper, the parts of which are all positively connected together, to be frictionally connected to its driver, so that should any matter get into the machine liable to or actually clogging it such mechanism will thereby stop, while the motor continues its motion, and thus obviate all danger of damaging the matter that has caused the clog. The importance of this provision for the stoppage of the operative mechanism is great in handling mail-matter, which frequently incloses irregular articles that would break through or rupture its envelop or cover and become lost in course of transit through the mail.

When the motor C is supported in a gimbal C, as in Fig. 1$^a$, the lower universal-joint connection $d$ in the driving-shaft will not be used, as the upper one will suffice for the purpose of accommodating the upper shaft-section to the motor-shaft section without careful alinement; but when the lower universal joint is also used, in addition to the upper one, the support of the motor will be rigid with the stand, as by an upper bearing $C^2$, (indicated by dotted lines in Fig. 2,) and in such case the frictional joint between the two sections of the shaft, as in Fig. 5$^a$, will be located, for convenience, in the upper universal joint.

The upper end of the shaft or shaft-section $D^2$ is mounted in a bearing $D^3$, extending upward into the trough or housing B', preventing the leakage of the oil therein down within the stand B, and to permit the temporary removal, as hereinafter explained, of the upper parts of the machine from gear with the driving parts the extreme upper end of the shaft-section is provided with one member of a coupling consisting of a pair of teeth $e$, arranged to engage a pair of studs $e'$, forming the other part of the coupling, which are on the main drivng-gear 80 of the machine. (See Fig. 4.) The trough or housing B' forms a top to the hollow stand B and closes its upper end, as in Fig. 2, and the base-plate A', resting upon the upper edge of the trough, forms a top thereto, protecting the oil therein and by its downward projection into the trough, as in Fig. 10, preventing its waste. Said base-plate may be secured in place in any proper manner; but as shown it is hinged to the trough, as in Figs. 8 and 9, by a rod $a$, passing through lugs $a'$ on the plate and trough. This hinging of the plate to its immediate support, such as the trough, permits the base-plate to be turned up vertically, as in Fig. 2, from its normal horizontal position to gain access to the trough and to the gearing carried by the base-plate, as will be hereinafter explained, and the movement of this plate may be limited by a chain $a^2$, the parts being so arranged that when the plate is in its vertical position the oil from the gearing referred to will drip back into the trough. When the plate A' is down in its horizontal position, the parts $e\ e'$ of the coupling before mentioned are engaged, so that the motor is connected to drive the operative parts supported by said plate, and this coupling is so constructed as to permit the ready turning up of the base-plate into the vertical position and the uncoupling of the parts $e\ e'$ without disarranging any of the operative parts, and said parts $e\ e'$ are also arranged for immediate recoupling upon the return of the base-plate to its horizontal position. The base-plate A' is formed around its upper edge with a shallow gutter $a^3$, guarded by a high flange, in which the dirt accumulating on the machine and base-plate may be brushed and collected for removal.

Referring now to the operative mechanism of the machine A, arranged above and supported by the base-plate A', said mechanism consists in the present construction, primarily, of a supporting traveling belt or carrier for the mail-matter, feed-rolls for carrying the matter through the machine, a separator for separating individual pieces of matter from a quantity of such pieces, so that the matter will be insured passing one piece at a time through the machine, a printing or embossing device and its accompanying appurtenances for marking the matter passing or in the act of passing through the machine, a trip, finger, or feeler determining by the present or presence of the matter to be marked the marking of such matter, and a stacker for assembling or taking care of the matter as it is delivered from the machine.

Near the right-hand end of the machine there is supported a traveling belt or carrier 20, stretched horizontally around a pair of rolls 21 22, the one roll 21 supported by bearings 23, bolted to the base-plate, and the other roll 22 by the separator-pillar 24 and the feed-roll bearing 25, both also bolted to the base-plate. The bolts for the bearings 23 (see Fig. 7) pass through slots in the feet of the bearings, so that should the carrier become sagged the bearings may be readjusted to stretch the carrier. The two carrier-rolls 21 22 are similarly constructed and are formed by two heads separated by a sleeve 22$^b$ (see Fig. 10) and secured within a cylinder forming the periphery of the roll. The heads revolve loosely on journals formed by a cross-rod 22$^a$, fixed in bearings 22$^c$ 22$^c$, the one in the pillar 24 and the other in the feed-roll bearing 25, and oil may be supplied to said journals through a channel in the cross-rod opening into the space between the rod and the surrounding sleeve 22$^b$. These rolls 21 22 are set at an angle to the direction of movement of the matter through the machine, so that the belt or carrier, on which the letters to be marked are placed edgewise vertically, will tend to carry the letters toward one side of the machine in contact with the feed-rollers hereinafter described. The belt or carrier 20 may be further supported and prevented from sagging by the weight of the mail-matter by an underlying idler-roll 29$^c$, supported in bearings in a bracket 29$^a$, extending from the separator-pillar 24, and in a bracket 29$^b$ on the bearing 25. The entrance portion of the belt and its upper surface is continued in substantially the same horizontal plane and its surface enlarged by a table 26, extending laterally on both sides of the belt and also to the right when looking at Figs. 6 and 7, which table protects the roll 21 and its bearings, provides an enlarged surface for resting matter thereon, and overlying a portion of the opposite longitudinal edges of the belt prevents the mail-matter from falling therefrom. This table 26 is supported by brackets 27, rising from the bearings 23 on opposite sides of the roll 21, and also carries a vertical back guard 28 and a front guard 28$^a$, confining the mail-matter to the belt, and the guard 28 aiding in directing it to the feed-rollers of the machine. The upper active surface of the belt or carrier is continued through the machine by a fixed plate 29, which serves as a guide for the bottom edge of the traveling matter, keeping it in position to pass through the machine and to be properly marked by the printing device.

The feed-rollers in the present machine are arranged at intervals along the path of the mail-matter passing through the machine and at such distances apart that the mail-matter after once starting in its path will be constantly borne upon and carried forward by one or the other of the feed-rollers in succession. The feed-rollers are mounted with their axes vertical and engage the broad surface of the mail-matter; and it is to be noticed that as the bearings for the rollers are all below the lower edge of the matter its path is not obstructed by any overlying crosswise-extending framework or arms that might restrict the capacity of the machine to handle matter below a given height, there being no limit to such height in this construction. It will also be noticed that the several rollers and other coacting devices are supported some distance above the base-plate, which provides a construction preventing the accumulation of dirt in proximity to operative parts, such dirt falling to the base-plate, where it will be less liable to interfere with the proper operation of the parts.

The initial feed-roller 30 and the supplementary roller 31 are supported from below by the roller-bearing 25, both at one side of the path of movement of the mail-matter, and extend above the carrier 20 and overlap its back edge slightly. They are both preferably skeleton rollers covered with a ring of soft rubber, as in Fig. 10, and the roller 31 is formed by two separated sections, so as to lap the roller 30, a portion of which runs between the sections of said roller 31. This arrangement allows the active letter-engaging surface of said rollers to be more or less close together, while the rollers are comparatively large in diameter, and the overlapping feature prevents matter being accidentally drawn between them and out of its regular path. The hub of each of these skeleton rollers and their sections have a notch straddling a pin 30$^a$ in the spindle, (see Fig. 10,) the roller being held in place on the pin by a clamp-screw 30$^b$, screwed into the end of the spindle.

Directly opposed to the initial feed-roller 30 there is located the separator-roller 32, which rotates in a direction the reverse of the feed-rollers 30 31, or against the direction of movement of the mail-matter and slightly slower in speed than said feed-rollers. Said roller 32 is divided into two separated sections, each formed by a skeleton roll covered by a rubber ring, as in Fig. 10. The separated sections of this roller 32 are pinned to a vertical spindle 33, carried by a bearing 34, which in turn is supported by a separator-plate 35. This separator-plate in the present embodiment serves two functions, the minor function of forming a side guard extending from the separator-roll to the pivot of said plate to keep the mail-matter in position on the plate 29 and the more important function of forming a supporting means for the separator-roll and of limiting the exposure of the periphery of said roll, so that any undue separating or retarding action of said roll is prevented.

In the preferred construction (see Figs. 11 to 14) each section of the roller 32 consists of a collar 19, having a flange at one end, the collar being pinned to the shaft 33, the ends of the pin projecting outward. On this collar is seated a brass cup or skeleton roll 18, carrying the rubber ring of the roller. The base of the cup has slots 17$^a$ to pass the projecting ends of the pin 17, and its surface is formed with opposite inclines 16 to pass below the pins, so that by turning the cup more or less on the collar it will be securely clamped between the ends of the pin and the flange of the collar. The forward end of the separator-plate 35, extending along one side of the path of the mail-matter, is carried by a vertical pivot 36, so that it and the separator-roller may be bodily adjusted to and from the feed-roller 30 to vary the throat or entrance for the matter between said two rollers and also to adjust the separator-roller to effect the proper separation of the mail-matter into individual pieces, according as the parts may wear and the varying conditions of the matter being fed into the machine may determine.

While it is possible to set the machine, and primarily the separator, to automatically separate a miscellaneous mass of matter into individual pieces for passage through the machine, it is often desirable when a large quantity of similar-sized matter is to be operated upon to set the separator especially for such matter, and hence provision is made for various adjustments of the separator plate and roller, as will presently appear.

The entrance end of the separator-plate is divided into fingers 37, one extending between the two sections of the separator-roller, as in Fig. 11, and the other two fingers extending above and below the said roller. The bearing 34 for the roller-spindle 33 is carried by a horizontal rod 38, projecting from the rear of the separator-plate, and by a guide-pin 39. The outer end of the rod 38 is screw-threaded and engaged by a thumb-nut 40, that is confined in place by a shoulder on the bearing 34, entering a groove in the hub of the thumb-nut. When the nut is turned in one direction or the other, the bearing 34, with the roller, is varied in its position with respect to the inner face of the separator-plate, the position of the nut being held by a spring-seated pin 9, engaging depressions in the nut, this adjustment primarily being to compensate for the wear of the roller.

The separator-blade and the separator-roller may be bodily adjusted mainly to compensate for the wear of the feed-roller 30 by a rod 41, (see Fig. 6,) the hooked inner end of which catches the hook of the center finger 37 of the plate, and its outer end passing through a bearing 42 is screw-threaded and engaged by a thumb-nut 43.

The separator plate and roller are held to duty against or toward the feed-roller 30 by a suitable spring, supplied in this case by a spring-blade 44, interposed between a shoulder 45 on the side of the printer-head stand 46 and one or the other of a number of notches or projections 47 on an arm projecting from the rear of the separator-blade. (See Fig. 12.) It is obvious that the location of the shoulder 45 and the notches 47 may be reversed. These notches being at different distances from the pivot of the separator-plate enable the spring to be set to bear with more or less force against said plate, the adjustment of the separator-plate and roller through the rod 41 and thumb-nut 43 being had in one direction against the force of said spring-blade.

Coacting with the feeding and separator rollers and the traveling carrier there is provided a deflecting-plate 48, fixed to a flange of the bracket 29ª in a position vertically and angularly above the carrier or belt 20, with its inner end immediately adjacent the separator-roll 32 and tending to direct the letters toward the throat between the feed-roller 30 and the separator-plate 35 and roller 32. The vertical outer surface of this plate 48 is serrated or ratchet-toothed, as in Fig. 6, which teeth engage the leading edges of the mass of letters placed on the belt 20 and prevent their tipping over and falling onto their broad faces on the belt. The angle of the plate 48 with its toothed surface also forms the mass of letters into a condition better adapted to cause the rearmost letter against the feed-roller 31 to be fed forward between the roller 30 and the separator-roll 32. This deflecting-plate 48 carries a yielding pressing-finger 49, mounted on a pivot to rock in an opening about central of said plate, a spring 50, connected to the heel of the finger, tending to hold it projecting across and over the carrier or belt 20, as in Fig. 6. When a mass of letters are placed on the belt and pressed with their leading edges against the sustaining-plate 48, the moving belt also tending to hold the letters in this position, the spring-finger will have yielded, as indicated by the arrow thereon in Fig. 6, to a point flush with the vertical surface of said plate 48, and as the mass of letters gets less and less in being fed onward by the feed-rollers the curved end of the pressing-finger commences to press the lessening mass of letters toward that side of the belt 20 occupied by the feed-rollers, the travel of the belt also aiding in carrying the letters in the same direction, and in this manner the extreme end of the finger forms a rest or stop to the broad side of the letters when in its outer position, as shown, and prevents their falling broadside onto the belt. Shortly after the leading edge of the letter gets between the feed-roller 30 and separator-roller 32 its lower edge leaves the traveling belt or carrier 20 and passes onto the stationary plate 29 and thence between a pair of oppositely-yielding feed-rollers 51 52, which are rotating at a higher speed than the feed-roller 30, and as the roller 30 and separator-roller 32 are not in firm biting contact they will not obstruct the quicker movement of the letter as soon as it is gripped by the rollers 51 52. This faster speed of said rollers 51 52 aids in obtaining a separation between the individual pieces of matter and insures the feed of the matter in separate pieces for presentation to the printing devices hereinafter described. The leading edge of the letter next passes between another pair of feed-rollers 53 54, rotating at the same speed as the rollers 51 52, and thence between the printing or marking roll 55 and platen-roll 56, with its lower edge still supported or in position to be supported by the fixed plate 29. Each of the rollers 51, 52, 53, and 54 is comparatively short in height, but sufficient to press upon the lower broad surfaces of the letter immediately above the fixed plate 29 and move it positively onward, and said rollers, with the exception of the roller 54, are mounted in a swinging journal 57, which permits them to yield laterally according as the passing letter may vary in thickness, the said rollers being held in biting position, limited in the case of the rollers 51 52 by their journals striking the sides of the fixed plate 29, as best seen in Fig. 15, by suitable springs 58, connected to the heels of the swinging journals, and to fixed pins, such as the pin $58^a$, Fig. 6, projecting from some convenient part of the framework. The rollers, as in Fig. 15, are of inverted-cup shape, so that the journal therefor may extend upon and within the roller to take the thrust in a proper manner and also protect its bearing from dust. The journal of the roller 52 is pivoted to the upper portion of the feed-roller bearing 25, the swinging journal of the roller 51 is pivoted to the stand 46, and the journal of the roller 53 is pivoted to a shaft $60^a$, fixed in the upright 60, while the roller 54 is mounted in fixed bearings in the stand 46. In addition to the feed-rollers 51 and 52 the passage of the letter is guarded on one side by the separator-plate 35 and upon the other side by a fixed plate 61, rigidly secured to the upright 60, the entrance end of which plate is flared, as in Fig. 6, and the forward end terminating adjacent the feed-roller 53.

Immediately adjacent the feed-rollers 53 54 and just in advance of the printing-roll 55 and platen-roll 56 there is located a trip, feeler, or finger 2, arranged to be operated, rocked, or moved to one side by the letter that may be present in the machine. In the present construction (see Figs. 16 and 18 to 25, inclusive) this finger 2 projects in the path of the moving letter, so as to be struck and rocked by the leading end of the letter passing between the feed-rollers 53 54 and just before reaching the bite of the printing and platen rollers 55 56. This finger 2 projects through an opening 15 in a removable trip-sustaining bar 62, that is fast by screw-bolts $62^a$ to a raised portion on the stand 46 with its inner end immediately above the roller 54, the inner face of which bar 62 provides a guiding edge for the letter moving forward between the feed-rollers. The finger 2 is pivoted about centrally to one end of a bell-crank 3, that is pivoted to said bar 62 at its under side, and the opposite end of said finger is connected by link 1 to the free end of a pawl 4, also pivoted to said bar 62. The pawl is arranged to project into the path of a projection on the printing-roll 55 to hold such roll against rotation. When the finger is rocked by contact of or with the letter, the pawl 4 is also rocked away from said projection $5^a$ on the printing-roll, so that said roll, no longer restrained, will immediately commence to rotate, so that when the leading edge of the letter reaches the bite of the printing and platen rolls said letter will be marked in passing between said rolls. The printing-roll 55 also carries a cam 6, which when the printing-roll is permitted to rotate bears against an arm of a lever 7, whose opposite end carries a friction-roll bearing against the free arm of the bell-crank 3. The lever 7 is fast to the upper end of a spindle $7^a$, extending upward in bearings in the stand 46, and just beneath the lever there is a retaining-pawl 11, hereinafter described, that is mounted loosely on said spindle. The lever 7 and the pawl are both held to duty and returned after each vibration by a U-shaped spring 10, (see dotted lines, Fig. 26,) the legs of which enter holes in the lever and pawl. The rocking of the lever 7 by the action of said cam rocks said bell-crank 3 against the pressure of the spring 8 and carries the finger 2, which is then in its rocked position, as in Fig. 19, inwardly away from the broad surface of the passing letter, as in Fig. 20. In moving to this latter position the finger 2, by reason of its linkage with the stop 4, is rocked on its pivot on the bell-crank 3 from the inclined position of Fig. 19 to the substantially-straight position of Fig. 20. The cam 6 is short enough to permit the lever 7 and bell-crank 3 to return to their normal positions very quickly after the printing-roll starts to rotate. The bell-crank and its finger 2 do not, however, immediately return to such position because of the end of the finger 2 meeting the surface of the letter not yet entirely through the feed-roller 53 54; but the pressure of the spring 8 is such that immediately the rear edge of the letter then being printed upon, or just previously printed upon, passes the finger 2 the spring 8 will force the finger to its normal projecting position ready to be struck by the succeeding letter. In the inward or retreating movement of the finger the parts are so proportioned that the end of the finger will move backward in line with its normal position in the arc of a circle, and in so moving backward a projection on the top surface of the finger will strike the beveled end of and raise a yielding latch-pin 14, that is mounted in the bar 62. This latch-pin is so arranged and the projection on the finger is of such length that when the finger is in its normal position (see Figs. 18 and 24) ready to be struck by the letter its projection will not meet the latch, and hence will be freely rocked by the letter. If, however, the finger has not fully returned to its normal position, as in Figs. 20 and 25, and a letter is forced against the finger or the broad surface of the letter whose edge has previously rocked the finger is still passing the point occupied by the finger and is bearing thereon with sufficient force as would ordinarily rock the finger, the projection of the finger in such case will meet the latch 14 and prevent the premature rocking of the finger, which would cause the printing-roll to rotate a second time for the same letter. The latch 14 is kept from turning by a tongue on the cap 12 entering the slot in the latch, a spring being seated in a recess in the latch and bearing against the tongue of the cap. In the return or partial return of the bell-crank with the finger 2 to the normal position the movement is great enough to have rocked or to permit a spring 13 to force the pawl 4 back into position to be struck by the projection 5 on the printing-roll, so as to hold said roll against making a second rotation, and thus printing the same letter a second time. The limit of movement of the bell-crank 3 and extent of projection of the finger 2 are determined by a hardened stop $f$, carried by the bar 62, and the limit of movement of the lever 7 is determined by a like stop $f'$, also carried by the bar 62. As the stoppage of the printer-roll is quite sudden, there is provided the retaining-pawl 11, arranged to engage the rear side of the projection 5 or some projection on the roll 55, so as to lock said printing-roll against rebound at the time of its being stopped, said pawl being limited in its movement by its free end striking a shoulder on the stand 46.

The trip or finger 2 is located just beyond the bite or adjacent the bite of the feed-rolls 53 54, so that the letter or other piece of matter passing through the machine will in the first instance be supported sufficiently rigid no matter how thin it may be at the time of its contact with the finger 2, so that the finger will be sure to be rocked by the letter and also so that the broad surface of the passing letter will withstand the lateral pressure of the finger at the time said finger is tending to return to its normal position, so that such finger shall not prematurely return to such position until the rear edge has passed the end of the finger.

The trip-sustaining bar 62 supports on its lower surface and suspended a distance above the base-plate the several parts of the trip or finger 2, including the bell-crank 3, spring 8, and pawl 4, so that when said bar 62 is removed the finger, pawl, and bell-crank may be removed with it for cleaning and the construction reducing to the minimum resting-places for the collection of dirt that would impede the free operation of the finger and pawl.

The stiffening of the leading edge of the letter to insure the rocking of the finger 2 may also be accomplished by a bifurcated finger 63, the bifurcations of which bear upon the rear side of the letter and hold its leading edge against the finger 2. This finger 63 is pivoted loosely on the shaft $60^a$, mounted in the upright 60, and is held to duty by a spring 64. (See Fig. 16.)

The platen-roll 56 is mounted in bearings in a swinging frame 65, fast to the rock-shaft $60^a$, carried by the upright 60. The main portion of said platen-roll is of rubber to aid in obtaining the proper impression on the letter and to better grip and feed the letter onward, and said roll, with its frame 65, yields with respect to the printing-roll 55 according as the passing letter may vary in thickness against the pressure of a spring 66 pressing against the lower portion of the frame. In the preferred construction of the platen-roll 56, as shown in Fig. 26, it consists of a tube $56^a$, surrounding the spindle, having at its lower end, rigid therewith, a flange $56^b$, with a pair of pointed pins projecting upward from the flange into a band of rubber forming the roll, said band being interposed and confined between said flange and a removable collar $56^c$, secured to the tube and its spindle, said collar also having pins to project into the body of the rubber band. The two sets of oppositely-projecting pins with the flange and collar securely hold the band in place and prevent it from slipping on the tube. Preferably this band of rubber is formed with a hard outer surface and a soft interior body, the outer surface to withstand the wear, while the inner body provides the needed pliability of the roll. It will be noticed that the height of the impression-surface of this roll 56 is simply sufficient to effect the proper printing or marking of the passing matter, so that the printing will be as little affected by any irregular inclosure in the letter as is possible, and thereby obtain a more regular impression than if the platen-rolls were high enough to be affected by the entire broad side of the latter.

The printing-roll 55 is mounted on a vertical spindle 67, having bearings in the stand 46. The spindle 67 is divided at a point within the stand 46 with stepped interlocking ends $67^a$ within a sleeve $67^b$, carried by the lower part, to cause the two parts of the spindle to move as a single piece and to facilitate the removal of the upper portion of the spindle with the printing-roll to readily change the roll for another should occasion require. This roll 55 consists substantially of three parts, the parts 68 and 69, secured to said spindle 67, and the part or printing-roll proper, 55, bearing the printing or marking die or characters, being interposed between said parts 68 and 69 and loosely mounted on said spindle 67. The lower part 69 is formed by an adjustable flange having an interior threaded opening to engage and screw onto a screw-threaded collar 71, pinned to the spindle 67, said flange being secured in place by a set-screw, as shown. By this means and by loosening the set-screw and turning the flange in one or the other directions said flange may be moved toward or away from the other fixed portion 68 and again secured in position by the set-screw. This adjustment is provided to take up the wear of the bottom hub of the roll 55 and also adjusts the extent of lost motion between the engaging surfaces of the clutch hereinafter referred to. Between the two parts 68 and 55 of the printing-roll there is interposed a clutch by which said type-carrying part 55 may be periodically connected so as to rotate with the part 68 and the spindle 67, which in the operation of the machine are continuously rotated. Thus in the recess in the lower end of the part 68 there is mounted a loose clutch-ring $m$, encircling the spindle, having a pair of projections $n$, resting upon a pair of inclines $o$ on the upper end of the type-carrying roll 55. The roll 55 carries within a recess a small U-shaped spring $p$, one end of which engages with the ring and tends to rotate it slightly to keep its projections on the high part of the inclines. This clutch-ring also carries the projection 5, before referred to, that is engaged by the pawl 4 of the trip or finger 2, and when so engaged, as in Fig. 18, holds the projections on the ring against the pressure of said spring $p$ to the low part of the inclines, as in Fig. 26, and thus relieves any frictional contact between the upper side of the ring and the part 68, and while so held the die-carrying part or roll 55 and the ring remain stationary, while the parts 68 and 69 and the spindle 67 continue to rotate. Immediately the pawl 4 engages the projection 5 of the clutch-ring the retaining-pawl 11 springs back between the shoulder of the cam 6 on the roll 55 and holds said roll fixed against return movement and holds the spring $p$ compressed by the rearward hold of the pawl 4. As soon as the pawl 4 is rocked from the projection 5, as in Fig. 19, the spring $p$ is free to act to rotate the clutch-ring slightly on the roll-spindle 67 and move its projections up the inclines of the roll, so as to force the upper surface of said ring into frictional contact with the under surface of the continuously-moving part 68, the friction against said part and the friction or wedging action of the projections of the ring on the inclines being sufficient to clutch the printing part or roll 55 to the continuously-moving parts until the pawl 4 again engages with the projection 5 to stop further rotation of the clutch-ring and of the printing part 55. It will be seen that after the printing or other marking has been done on the passing letter the printing part 55 stops in a position, Figs. 16 and 18, in which a blank space is presented to the remainder of such letter, so that the letter does not drag against any marking-surface of the printing part, the forward feed of the letter, however, being continued, if desired, by the bite of the lower portion or flange 69 of the roll with opposed surface of the platen-roll 55.

Ink is supplied to the printing part or roll 55 from an ink-fountain 73 and a pair of intermediate felt rollers 74 75, the latter roller being in position to ink the printing-surface of said roll 55. The ink-fountain and said inking-rollers are supported in bearings in a holder 76, that is mounted on a vertical bar $76^a$, rising from and removably supported in the stand 46, the upper end of the bar carrying an arm $76^b$, having at its end a bearing for the upper end of the printing-roll spindle 67 to aid in more completely supporting said spindle. When the printing-roll and its spindle are to be removed, the bar $76^a$ is raised bodily in its bearing in the stand 46 to lift the arm from the end of the spindle 67, the bar $76^a$ remaining raised by reason of its tight fit in said bearing. The holder 76 is adapted to be swung on the bar $76^a$ to one side to carry the roller 75 from ink-applying position to an idle position (see dotted lines, Fig. 16) against the pressure of the spring 77, bearing against a toe on the holder, and thus give access to the printing-roll for changing its type or for other purposes. The toe on the holder is so positioned with respect to the spring 77 that said spring also tends to hold the holder in its idle position, as well as in its operative position, against an adjustable stop $75^a$, which determines the position of the inking-roller 75 with respect to the printing-roll 55. The stop $75^a$ is held to duty by a thumb-screw $75^b$, bearing against the stand 46 and the screw held in adjusted position by a spring-detent $75^c$, engaging recesses in the rear of the head of the screw, as in Figs. 27 and 30.

The holder 76 is provided with a vertical wall open on its inner side to allow the felt roller 75 to project into the path of the moving printing-surface to ink the same, said wall forming a guard sufficiently high to prevent accidental contact and shield the ink rollers and fountain. The holder also forms a carrier for said ink rollers and fountain, so that the whole may be bodily removed, if desired, while each of the rolls and the fountain may be removed independently from the holder 76. The intermediate felt roller 74 is adjustably mounted in a slot in the holder, so as to be moved to and from the roller 75 by moving the handle 78, which forms its bearing, which handle is held in place after each adjustment by a clamp $74^a$ and a thumb-nut $74^c$. The spindle of the roller 74 is driven positively in a manner hereinafter described and by its adjustment just described may be moved into frictional contact with the fountain and with the roller 75 to drive them.

The ink-fountain 73 consists of a hollow cylindrical receptacle having a closed base and closed at its upper end by a removable cover $73^a$. From the base projects interiorly of the receptacle a central stem $73^b$, which is hollow for a short distance upward from the base to receive a fixed stud $76^c$, rigid with the holder 76 and on which stud the cylindrical fountain revolves. The central stem projects through the cover $73^a$ and is screw-threaded at its upper end to be engaged by a thumb-nut $73^c$, which serves to hold the cover closed. At one side of the interior of the fountain its wall $73^d$ is thickened and is perforated with a series of small holes $73^e$, (see Fig. 28,) which communicate with the exterior of the fountain and are adapted to allow ink to pass from the fountain to the outside to be taken by the inking-roll 74. These holes are governed by a vertical and rotating rod or plug $74^e$, fitting a vertical recess in said thickened wall and also perforated to coincide with said holes, and the stem 74¹ of this plug extends upward through the cover 73ᵃ and on the outside thereof is provided with a turn-button 74ᵒ, by which the plug may be rotated to more or less open or entirely close said holes 73ᵉ.

The several rollers, feed-rollers, and traveling belt or carrier in contradistinction to the old constructions using belts are rotated positively in unison by gearing connected with the main driving-shaft D, and for this purpose the several spindles of the rollers are provided with gears in mesh with the main driving-gear 80, that is provided with the studs e'. (See Figs. 2 and 4, before referred to.) The main portion of the gearing is interposed and supported by a gear-plate A², connected to and suspended from the under side of the base-plate A' by studs A³, as in Fig. 9, said gear-plate also forming a bearing for the lower ends of some of the driving-spindles and arranged to rest with the gearing in the oil in the trough B', so that the gears and lower ends of the spindles may be constantly lubricated.

The belt or carrier 20 is constantly moved through a pair of beveled pinions 81, one secured to one of the heads of the belt-roller 22 and the other secured to the vertical spindle 82 of the feeding-roll 30. (See Fig. 10.) This feeding-roll spindle is mounted in bearings in the bearing 25, with its lower end resting against a hardened steel-plate 82ᵃ, fastened to the gear-plate A², and said spindle is provided near its lower end with a gear 83, in mesh with an intermediate 84 on a stud also carrying another gear 84. Said gear 85 is driven by an intermediate 86 and a gear 87 from the main driving-gear 80. The feed-roller 31 is mounted on a spindle 88 and has a gear 89 at its lower end in mesh with said gear 84. The separator-roll 32 is likewise continuously rotated from the gear 86, meshing with an intermediate 90, having on its stud a pinion 91, that meshes with a gear 92, fast to the lower end of a vertical spindle 93, supported by a bottom plate, as the spindle 82, and rising upward and having bearings in a separator-pillar 24. The upper end of said spindle 93 carries a pinion 94, which through a train of intermediates 95 drives a short spindle 96, mounted in the overhanging head of the pillar, which through a universal-joint connection 97 drives the separating-roll 32, the direction of rotation of said roll being the reverse of the feed-rolls 30 and 31 and in fact of the remainder of the other rolls of the machine. The two feed-rollers 51 and 52 are likewise driven in unison by the gear 87 and another gear 98, the shaft of the feed-roll 51 being connected to the shaft of the gear 87 by a universal connection 99 and the shaft of the feed-roll 52 being similarly connected to the shaft of the gear 98 by a universal connection 100, said two gears 87 and 98 being driven by the main driving-gear 80. The feed-roller 52 is driven by a gear 101, secured to the lower end of its spindle 102, said gear being in mesh with the gear 80, and the companion feed-roller 53 is driven by a gear 103, secured to a shaft connected with said feed-roller by a universal connection 104. The spindle 67 of the printing-roller is provided with a gear 105, in mesh through an intermediate 106 with the gear 101, and a platen-roller 66 is connected, through a universal connection 107, with a shaft having a gear 108 in mesh with said gear 105. The intermediate ink-roller 74 is connected, through suitable universal connections 109, with a shaft having a gear 110, secured thereto, driving from the gear 105 through the intermediate 111. The same gear-plate A² also supports a pair of gears 112 113, fixed to the lower end of the vertical shaft, a pair of intermediates 114 115, and another gear 116, fixed to the lower end of another vertical shaft, as seen in Fig. 9. The several universal connections described between gearing and the rolls or the shafts and the rolls enable said rolls to yield laterally to more or less extent, according as the thickness of the passing letter may determine, and yet permit said rolls to be driven positively and without interruption. The several universal connections are similarly constructed and consist, as in the one shown in Figs. 10 and 11, of a pair of countersunk heads 117 118, arranged to receive the ball-shaped end formed at the opposite ends of the connection 97, said ball-shaped ends having pins 119 projecting into slots 120 in said countersunk heads.

As so far described the mail or other matter has been fed through the machine and marked in passing between the printing and platen rolls 55 56, the speed of operation of the machine or number of individual pieces marked being only limited to the speed of the motor driving such machinery modified slightly by the length of the matter being marked or printed upon. In view of the great speed of such machines and the desirability to collect the marked matter passing therethrough in an orderly manner it is necessary to provide means by which the matter may be properly collected or stacked operating in unison with or as fast as the machine proper may operate. The high speed and rapidity with which the marked mail-matter is delivered from the printing and platen rolls makes it essential that the receiving device or stacker shall be completely automatic in its action, be capable of receiving all varieties of mail-matter with equal facility, and continue to be as efficient in its operation no matter how the accumulation of mail-matter may change. To this end the stacker S, coacting with the improved machine, consists in the main of a freely-moving receiving-carrier 150, arranged to move bodily with the accumulating mail-matter by the action of said matter in making room for itself and of a rotating blade or blades 151, arranged at the receiving end of the carrier to aid and insure the provision of sufficient space for the succeeding letter between itself and the preceding letter delivered on the carrier. The receiving-carrier is in the form of an endless metal chain composed of links, each having a broad carrying-surface $g$ and opposite ends $h$, bent to engage pivot-pins $j$, which connect adjacent links together, the rear longitudinal edge of one link overlapping the front edge of the rearward link, so that the series of overlapping edges will present cross-ridges against which the lower edges of the mail-matter may catch and thus have sufficient hold on the carrier to move it along as the letters are pressed forward in the direction of the length of the carrier. The carrier is stretched around a pair of flanged disks 153, mounted to rotate freely on a cross-shaft 154, fixed at each end of the stacker side frames 155, that are carried by end pieces 158 159, the end piece 158 being firmly bolted to the base-plate A' of the machine. The lower edges of the bent ends $h$ of the several links 4 rest upon the disks 153. The flanges extending upon the inner side of the link ends $h$ keep the carrier in alinement and prevent side displacement. The upper carrying-surface of the carrier is held from sagging intermediate of the pairs of disks 153 by a pair of rails composed of a series of idler flanged disks 156, fixed to spindles freely rotating in bearings in the side frames 155, the link ends $h$ resting upon said disks and the flanges extending upon the inner side of said ends. The lower or return portion of the carrier is carried upward over an idler-roller 157, freely rotating in bearings in the side frames 155, and by which roller much of the weight of the return portion of the carrier is taken, relieving the pairs of flanged disks 153, so that they will move more freely. The end piece 159 is curved to partially surround and protect the portion of the carrier turning around the pair of disks 153 at that end of the stacker and has an upright, to which one end of a longitudinal back bar 160 is attached, guarding the rear edges of the letters carried onward by the carrier, and the other end piece 158 supports a horizontal plate 161, forming a continuation of the fixed bottom plate 29 of the machine proper, the forward edge of such plate partially overlying that portion of the carrier turning around and leading from the pair of disks 153 at that end of the stacker. This plate 161 receives the letters as they arrive on the stacker and supports them temporarily until they are moved outward far enough to fall of their own weight from the edge of the plate onto the upper surface of the carrier. From the printing and platen rolls 55 56 the mail-matter passes on edge between a pair of stacker feed-rollers 162 163 onto the receiving-plate 161. The roller 163 is a rubber-covered one mounted vertically on a spindle 164 in fixed bearings in bracket extending from the end piece 158 and rotated continuously by the gear 113, secured to its lower end. (See Fig. 9.) The other feed-roller 163 has a metal face carried in a bearing at the end of a horizontally-rocking arm 165, pivoted to the receiving-plate 161. The mail-matter is prevented from following roller 162 by a stripping-plate 166, which, like the back bar 160, forms a guard for the rear edges of the letters in the stacker, and the other roller 163 is provided with a similar plate 167, which covers the top end of the roller and also forms a prolonged guide extending along in the direction of travel of the letters, the end of the guide-plate being secured to and carried with the arm 165. The roller 163 preferably rotates by frictional contact with the roller 162 and yields with respect to said latter roller against the pressure of a spring 168 to accommodate the passage of letters of varying thickness; but said roller may be driven positively, as by the gear 112 before referred to. (See Fig. 9.)

Immediately adjacent the end of the guide-plate 167 and the pivot of its rocking arm 165 there is mounted the rotating blade or blades 151, standing vertically above the receiving-plate 161, with the blades rotating horizontally across the path of the letter projected forward by the stacker feed-rollers. The blades are carried by a hub 170, fast to the upper end of a spindle 171, that is mounted in bearings in the end piece 158 and extending down through the base-plate A', and carrying at its end the gear 116, which, through the intermediates 114 115, (see Fig. 9,) imparts positive rotations to the blades in unison with the other parts of the machine A. In the preferred construction the blades are three in number, of the same or different lengths, with their ends bent inward slightly out of tangent with the hub 170, so that their broad surface may strike the delivered letter $x$ and push it laterally out of the path of the forward edge of the succeeding letter $v$ in contradistinction to its vertical edge striking the letter. The bend of the blades also forms a vertical pocket between the blade and the hub, in which the leading edge of the letter $v$ may enter and follow the blade for a short distance in its rotation as that blade is making room for it between its hub and the delivered letter $x$. The leading edges of the delivered letters strike a front stop-arm 172, which arrests their further onward movement and confines the letters on the receiving-plate in proper position to ultimately move onto the carrier 150. The arm 172 is jointed near one end, so that its outer end may be turned up to permit the removal of the accumulated letters in the carrier. This arm is carried at the upper end of an upright projecting from a footpiece 173, mounted in a guide 174, fixed to the back of the plate 161, and arranged to be moved back and forth in said guide by loosening a clamp-nut 175 to vary the distance between the stop-arm 172 and the rotary blades 151 to facilitate the better stacking of unusually long or short letters. The stop-arm carries a guard 176, occupying a position forward and slightly back of the rotary blades 151, and with a fixed piece 182 forms a guard for the leading edge of the delivered letter as it strikes the stop-arm 172 and confines the letter to the receiving-plate and prevents it from being forced off the rear of said plate. The inner portion of this guard 176 is curved rearwardly and leaves a space between its end and the rotating blades, so that should any letter tend to follow around with the blades and not strike the stop-arm 172 it will be free to do so without injury to the letter. This provision for the free relief of a letter improperly delivered for any reason, occasioned many times by its extreme shortness, is very important, as it prevents any choke that would disturb the proper delivery of succeeding letters. The adjustment of the front stop-arm to or from the rotating blade is important in that it is desirable that the letters shall be arrested on the receiving-plate with the greater length on the opposite side of the rotating blades 151, as indicated in Fig. 31, and thus insure the delivered letters assuming the inclined position shown, with their rear edges thrown away from alinement with the stacker feed-rollers 162 163, and hence provide a clear unobstructed space for the entrance of the leading edge of the succeeding letter.

The stacker is preferably provided with a letter-sustaining plate 177, extending across the top surface of the carrier 150 in an inclined position corresponding to the position assumed by the letters. This plate 177 is carried by a slide 178, mounted to move freely on a guide-rod 179, supported parallel with the carrier by the end pieces 158 159. The inner lower end of the sustaining-plate 177 has a pin or lug 180 to enter holes 181 in the links of the carrier, so that the pressure of the letters on the plate will be communicated to the carrier to move them bodily together.

The machine is provided with a means of counting or tallying the number of impressions made by the printing-roll 55 or the number of pieces of matter passing through the machine, and the connections leading to and operating the counter T forms one of the features of these improvements. The counter and its operating connections are supported by and entirely inclosed within the printer-head stand 46, (see Figs. 26 and 26$^a$,) with the face, dial, and hands exposed to the front of the machine, as in Figs. 1 and 7. The counter itself may be of any ordinary kind, that represented being similar to those employed in motors of various descriptions. The connections with an operative part of the machine and the actual actuating means are important, because provision is made for positive movements which are particularly adapted to the very high speed at which it must operate for effective work. As shown in Fig. 26, a convenient operating part of the machine for effecting the timely movement of the counter T is represented by the lever 7, forming part of the mechanism associated with the finger 2 and printing-roll clutch mechanism, Figs. 16 and 18 to 21, inclusive, before described. This lever 7 is fast to the upper end of the shaft 7$^a$, mounted to rock in vertical bearings in the stand 46. The lower end of this rock-shaft within the stand carries an arm 7$^b$, having at its end a spring-pressed pin engaging the teeth of a peculiar-shaped ratchet 7$^c$, that is fast to one end of the counter-shaft T'. The teeth of this ratchet are parallel with the axis of the shaft for a short distance and are then inclined, so as to enable the arm 7$^b$ and its pin to be moved an abnormal distance when the lever 7 is rocked out of normal in the act of removing the printing-roll 55 and its spindle 67. The counter-shaft is also provided with a ratchet 7$^d$, engaged by a spring-detent, as in Fig. 26$^a$. The head of the pin carried by the arm 7$^b$ is guarded by an overlying finger 7$^e$ to prevent the pin from lifting from the ratchet while it is actively moving the latter. Each time the printing-roll 55 is released by the pawl 4 to mark a letter the lever 7 is rocked by the cam 6, and thereby rocks its shaft 7$^a$ and vibrates the arm 7$^b$ to move the ratchet 7$^c$ one step and so operate the counter.

The trip-finger herein shown is substantially like that set forth in my allowed application, Serial No. 443,462, and hence is not herein claimed. The clutch herein shown is also set forth in my allowed application, Serial No. 442,654, and is not claimed herein; and the general form of stacker herein is set forth in the joint application of myself and M. J. Dolphin, Serial No. 472,569, and is not claimed herein, except so far as is claimed herein as my sole invention.

What is claimed is—

1. In a mail-matter machine, the herein-described mechanism mounted on vertical spindles, a base-plate having bearings for said spindles, gearing for said spindles carried by the base-plate, a hollow stand supporting the base-plate, to which it is pivotally connected, a motor mounted within said stand and supported by its walls, a vertical shaft within the stand and extending from the motor to the gearing carried by the base-plate and a disconnective coupling between said shaft and gearing.

2. A hollow stand inclosing a motor, an oil trough or housing on said stand, a base-plate for an automatic mechanism supported on the trough and bearings formed in the wall of the trough for a shaft connecting the mechanism with the motor.

3. An oil trough or housing, a base-plate for an automatic mechanism supported on the trough and bearings below and supported by the base-plate for the gearing of the mechanism within the trough, and a bearing formed in the wall of the trough for a driving-shaft.

4. An oil-trough having a bearing projecting upward into said trough for a driving-shaft, and a base-plate supporting operative mechanism on the trough and connections between said mechanism and the driving-shaft.

5. A supporting-stand having bearings for a driving-shaft, a base-plate hinged to the stand and carrying operative mechanism on its opposite sides and a coupling interposed between said mechanism and the driving-shaft the parts of which coupling adapted to be disconnected by the movement of the base-plate on its hinge.

6. In a mail-matter machine, herein-described feed-rolls mounted on vertical spindles, a base-plate below the feed-rolls, another plate below the base-plate both plates forming the supports for said spindles, whereby the matter fed by the rolls is unobstructed by upper bearings, gearing for said spindles interposed between the two plates and a housing protecting said gearing.

7. The combination of a feed-roller, an opposed separator-roll, a separator-plate carrying a bearing for the separator-roll and hinged at its forward end and adapted to swing laterally to and from the feed-roller, and an adjusting device engaging the plate for determining its position with respect to the feed-roller, substantially as described.

8. The combination of a feed-roller, an opposed separator-plate hinged at its forward end, a separator-roller carried by the plate, and means for adjusting the plate and roller to and from said feed-roller, substantially as described.

9. The combination of the feed-roller, a separator-plate, the separator-roller, means for adjusting the roller with respect to the plate, and means for adjusting the plate with respect to the feed-roller, substantially as described.

10. The combination of a separator-plate, a separator-roller, a bearing for the same, a guide-pin and an adjusting-rod projecting from the plate supporting said bearing, substantially as described.

11. The combination of a separator-plate, a separator-roller, a bearing for the same supported by the plate, an adjusting rod and nut for the bearing, and a spring-pin for engaging the nut, substantially as described.

12. The combination of the feed-roller, the laterally-moving separator plate and roller, bearings on the plate for said roller, and a spring for holding the plate and roller toward the feed-roller, substantially as described.

13. The combination of the laterally-yielding separator-roller and plate carrying said roller a spring-blade bearing against the plate and a series of notches for the blade for changing the tension of the spring-blade, substantially as described.

14. The combination of the feed-roller, the opposed laterally-yielding separator-roller, the separator-plate carrying said separator-roller, the separator-pillar inclosing a driven spindle, a short depending shaft also supported by the pillar, gearing connecting said shaft to the spindle, and a universal connection from said shaft to the roller, substantially as described.

15. The combination with the feed-roller and a separator-roller, of a succeeding pair of feed-rollers less in height than the first-mentioned roller, means for driving said rollers positively, yielding bearings for said feed-rollers permitting them to yield laterally independently and a narrow elevated fixed plate on which the mail-matter travels mounted between the yielding bearings and forming a stop thereto.

16. The combination with the feed-roller and separator-roller, of a succeeding pair of feed-rollers mounted in laterally-yielding bearings, another succeeding pair of feed-rollers, one of the rollers mounted in fixed bearings and the other in laterally-yielding bearings, substantially as described.

17. The combination with the opposed vertical feed-rollers for the mail-matter, each of inverted-cup shape, a spindle depending therefrom and bearings for the same extending within the roller, and a narrow elevated fixed plate on which the mail-matter moves mounted between the bearings and below the lower edge of said rollers, as set forth.

18. The combination of the yielding feed-roller, a coöperating feed-roll and a narrow stationary elevated plate for the lower end of the matter passing between the rollers, said plate interposed between the bearings for the rolls forming a stop for limiting the bite of said feed-rollers, substantially as described.

19. The combination with a supporting bed-plate, of the endless carrier-belt supported above said bed-plate, the elevated stationary narrow plate forming a continuation of said belt, and oppositely-arranged feed-rollers mounted independent of the elevated plate for carrying the mail-matter forward on said elevated plate, substantially as described.

20. The combination with the base-plate, the endless carrier-belt and the stationary plate forming a continuation thereof supported in an elevated position above the base-plate, of a number of feed-rollers arranged upon opposite sides of the stationary plate and having bearings also elevated above the base-plate, substantially as described.

21. The combination of the carrier-belt, the feed-roller, the separator-roll, an angularly-arranged deflecting-plate extending over the carrier-belt and a spring-pressed finger for preventing the letters on the belt from falling laterally, substantially as described.

22. The combination with the marking-roll, of the removable sustaining-bar, a stop for the roll and a letter-engaging finger for moving the stop, both the stop and finger mounted upon the under side of said bar whereby the accumulation of dirt thereon is prevented and the whole is removable bodily from the machine, as set forth.

23. The herein-described removable trip-sustaining bar having the trip or finger mounted on a vertical axis and sustained below the under side of the bar.

24. The combination of the sustaining-bar, a lever pivoted to its under surface, a trip or finger carried by said lever, and stops formed on the bar for limiting the movement of said lever, whereby the parts are suspended and the accumulation of dirt thereon prevented, substantially as described.

25. The combination with the marking-roll, of the removable sustaining-bar, a movable trip or finger carried on the under side of said bar for controlling the operation of said roll, means for holding said finger in its operative position, a shoulder on the finger, and a yielding latch-pin adapted to oppose the movement of the finger in one direction when not in operative position, as set forth.

26. The combination with the marking-roll, of the trip or finger for controlling the operation of said roll, the yielding stop-pin for the finger having a slotted end, a tongued cap-plate engaging the slot of the stop-pin, and a spring interposed between the pin and the cap-plate, substantially as described.

27. The combination of the printing-roll, the letter-engaging finger for controlling the operation of said roll, the lever for returning the said finger, a restraining rebound-pawl for the roll and a single spring for returning the pawl and lever, substantially as described.

28. The combination with the marking-roll, the letter-engaging finger for controlling the operation of said roll, the lever for returning said finger, a counter and connection with said lever for operating the counter, substantially as described.

29. The combination with the marking-roll, the letter-engaging finger for controlling the operation of said roll, the lever for returning said finger, the rock-shaft carrying the lever, a counter and connections with the rock-shaft for operating the counter, substantially as described.

30. The combination with the printing-roller having a cam, of a finger for controlling the operation of the roller, a lever moved by said cam, a counter, connections between the lever and counter for operating the latter and between said lever and the finger for returning said finger, substantially as described.

31. The combination with the printing-roll spindle having upper and lower rolls fixed thereto, of a printing-roll interposed between said upper and lower rolls and resting on the lower roll, and means for vertically adjusting said lower roll and printing-roll relatively to the other rolls whereby the position of the printing-roll is controlled, substantially as described.

32. The combination of the printing-roll spindle the printing-roll mounted thereon, a screw-threaded collar fixed to the spindle and a vertically-adjustable roll engaging said collar, substantially as described.

33. The combination of the printing-roll spindle formed in two parts with stepped engaging ends, a printing-roll carried by one part, means for driving the other part of the spindle, and bearings for the spindle permitting the withdrawal of the part of the spindle carrying the printing-roll, and a platen coacting with the printing-roll, as set forth.

34. The combination of the printing-roll, its spindle, a fixed lower bearing for the spindle, a vertically-removable and laterally-swinging upper bearing for the spindle whereby the roll may be removed, and a coacting platen, substantially as described.

35. The combination of the printing-roll, its spindle, a fixed lower bearing for the same, a vertical removing-rod having at its upper end a bearing for the upper end of the spindle, means for supporting the rod, and a platen coacting with said roll, substantially as described.

36. The combination of a feed-roller, an opposed separator-plate movably mounted with respect to the feed-roller, a separating-roll mounted in and carried by said plate and a spring for holding the plate and roll yieldingly toward the feed-roller, as set forth.

37. The combination with the feed-roller and separator-roller, of the printing and platen rolls, an intermediate feed mechanism and means for driving the printing and platen rolls and intermediate feed mechanism faster than the feed-roller, as set forth.

38. The combination with the printing-roller, of the letter-engaging finger controlling the printing movement of said roller, a bifurcated shoe opposed to the finger, an adjacent feed-roll and means adapting the shoe and roll to yielding independent of each other, as described.

39. The combination with the printing-roller and the letter-engaging finger controlling the printing movement of said roller, of the stand 60, the feed-roller supported by said stand, the bifurcated shoe also supported by said stand independent of the feed-roller and straddling the finger, and springs for said shoe and roller permitting each to yield independent of the other, substantially as described.

40. The combination of the intermittently-moved printing-roller, an ink-fountain and ink-rollers, a swinging holder carrying said fountain and rollers independent of said printing-roller and a spring engaging the holder for holding it in its adjusted positions, substantially as described.

41. The combination of the intermittently-moved printing-roller, the movable holder supporting the ink-rollers independent of said printing-roller, and a stop for determining the position of the holder, a screw for adjusting the stop, and a spring-detent for holding the screw in its adjusted position, substantially as described.

42. In a mail-matter-marking machine, the combination with the marking-machine, of a stacker therefor including an endless freely-moving chain formed by overlapping links providing a plurality of ridges against which the bottom edges of the mail-matter may bear.

43. In a mail-matter-marking machine, the combination with the marking-machine, of a stacker therefor including an endless freely-moving chain formed by overlapping links providing a plurality of ridges against which the bottom edges of the mail-matter may bear, a series of track-disks supporting the upper stretch of the chain, and an intermediate roll supporting the return portion of the chain, as set forth.

In witness whereof I have hereunto set my hand in the presence of two witnesses.

FREDERICK G. JAHN.

Witnesses:
GEO. H. GRAHAM,
E. L. TODD.